(12) United States Patent
Kouchi et al.

(10) Patent No.: US 7,709,582 B2
(45) Date of Patent: May 4, 2010

(54) EPOXY RESIN COMPOSITION FOR FIBER REINFORCED COMPOSITE MATERIAL, A PRODUCTION METHOD FOR FIBER REINFORCED COMPOSITE MATERIAL, AND A FIBER REINFORCED COMPOSITE MATERIAL

(75) Inventors: Shinji Kouchi, Ehime (JP); Mariko Ishikawa, Kyoto (JP); Hiroki Oosedo, Ehime (JP); Go Tanaka, Ehime (JP); Toshiya Kamae, Ehime (JP)

(73) Assignee: Toray Industries, Inc., Chuo-ku, Tokyo (JP)

( * ) Notice: Subject to any disclaimer, the term of this patent is extended or adjusted under 35 U.S.C. 154(b) by 25 days.

(21) Appl. No.: 11/808,108

(22) Filed: Jun. 6, 2007

(65) Prior Publication Data

US 2008/0108761 A1 May 8, 2008

Related U.S. Application Data

(62) Division of application No. 10/493,811, filed on Apr. 27, 2004, now abandoned.

(51) Int. Cl.
*C08G 59/50* (2006.01)
*C08L 63/00* (2006.01)

(52) U.S. Cl. .................. 525/523; 528/120; 528/405

(58) Field of Classification Search .................. None
See application file for complete search history.

(56) References Cited

U.S. PATENT DOCUMENTS

| | | | | | |
|---|---|---|---|---|---|
| 3,954,650 A | * | 5/1976 | Bliss | ...................... | 252/182.13 |
| 4,366,108 A | * | 12/1982 | Urech et al. | ................. | 264/137 |
| 4,528,305 A | * | 7/1985 | Henry | ......................... | 523/219 |
| 4,680,076 A | * | 7/1987 | Bard | ........................ | 156/306.9 |
| 4,757,117 A | * | 7/1988 | Moss | .......................... | 525/483 |
| 5,011,721 A | * | 4/1991 | Decker et al. | ............... | 428/36.9 |
| 5,503,936 A | * | 4/1996 | Blyakhman | .................. | 428/413 |
| 5,985,431 A | * | 11/1999 | Oosedo et al. | ............ | 428/297.4 |
| 6,410,127 B1 | * | 6/2002 | Kamae et al. | ............. | 428/297.4 |
| 6,596,373 B1 | * | 7/2003 | Kishi et al. | .................. | 428/116 |
| 6,838,176 B2 | * | 1/2005 | Goto et al. | ................... | 428/413 |
| 6,875,825 B2 | * | 4/2005 | Kaneko et al. | .............. | 525/526 |

FOREIGN PATENT DOCUMENTS

| | | | |
|---|---|---|---|
| EP | 0 262 891 A2 | | 4/1988 |
| EP | 1094087 A1 | | 4/2001 |
| EP | 1 116 774 A2 | | 7/2001 |
| GB | 798177 | * | 7/1958 |
| JP | 60-6722 A | * | 1/1985 |
| JP | 2-2124919 A | * | 5/1990 |
| JP | 5-132540 | | 5/1993 |
| JP | 8-176325 | | 7/1996 |
| JP | 8-176325 A | * | 7/1996 |
| JP | 10-182793 | | 7/1998 |
| JP | 10-182793 A | * | 7/1998 |
| SU | 499282 A1 | * | 1/1976 |
| WO | WO-01/27190 A1 | | 4/2001 |
| WO | WO-01/81445 A1 | | 11/2001 |

OTHER PUBLICATIONS

HCAPLUS accession No. 1980:427226 for the Poluch., Svoistva Primen. Plastmas Osn. Reaktsionnosposobn. Oligomerov article by Yurechko et al., 1978, one page.*
Dow Product Information Sheet for D.E.R. 383 liquid epoxy resin, 1989, three pages.*
Varma et al., "Epoxy resons: effect of amines on curing," Journal of Composite Materials, vol. 20, No. 5, 1986, one page.*

* cited by examiner

*Primary Examiner*—Robert Sellers
(74) *Attorney, Agent, or Firm*—Morrison & Foerster LLP

(57) ABSTRACT

An embodiment of the invention relates to an epoxy resin composition for fiber reinforced composite material having an epoxy resin that is liquid at room temperature (component 1), aromatic polyamine that is liquid at room temperature (component 2) and diaminodiphenylsulfone (component 3). The proportion of component (1) relative to the entire epoxy resin in the composition is 60-100 wt %. The sum of the proportions of components (2) and (3) relative to the entire polyamine in the composition is 70-100 wt %. The proportion of component (3) relative to the entire polyamine in the composition is 25-60 wt %. The stoichiometric ratio of the entire polyamine to the entire epoxy resin in the composition is 0.7-1.3. Additional embodiments of the invention relate to other aspects of the invention.

9 Claims, No Drawings

EPOXY RESIN COMPOSITION FOR FIBER REINFORCED COMPOSITE MATERIAL, A PRODUCTION METHOD FOR FIBER REINFORCED COMPOSITE MATERIAL, AND A FIBER REINFORCED COMPOSITE MATERIAL

CROSS-REFERENCE TO RELATED APPLICATION

This application is a divisional application of U.S. Ser. No. 10/493,811, filed Apr. 27, 2004, now abandoned, the entirety of which is incorporated herein.

TECHNICAL FIELD

The present invention relates to an epoxy resin composition that is useful for production, by resin transfer molding (RTM) in particular, of high performance fiber reinforced composite material, and also relates to a molding method that uses said resin composition.

BACKGROUND ART

Fiber reinforced composite materials that consist of reinforcing fiber, such as glass fiber, carbon fiber and aramid fiber, and matrix resin, such as unsaturated polyester resin, vinyl ester resin, epoxy resin, phenol resin, cyanate ester resin and bismaleimide resin, are lightweight but high in strength, rigidity, shock resistance, fatigue resistance and other mechanical properties, in addition to being high in corrosion resistance, and accordingly have been used in aircraft, spacecraft, automobiles, railroad vehicles, ships, construction material, sporting goods, and many other materials in different fields. In particular, fiber reinforced composite materials composed of continuous fiber are generally used to produce high performance products, with carbon fiber and thermosetting resins, epoxy resin among others, being frequently used as reinforcing fiber and matrix resin, respectively. In a widely used process to produce fiber reinforced composite material that consists of continuous fiber and thermosetting resin, prepregs composed of reinforcing fiber and uncured thermosetting resin are produced as intermediate, followed by their lay-up and heat curing. This process, however, cannot be said to be excellent in terms of cost because it requires production of prepregs as intermediate. Compared to this, a production technique called resin transfer molding (RTM) in which liquid thermosetting resin is injected into a reinforcing fiber substrate placed in a mold, followed by heat curing to produce fiber reinforced composite material, has attracted much attention in recent years due to its high productivity in manufacturing fiber reinforced composite material. Recent reports on resin transfer molding (RTM) include SAMPE Journal, Vol. 34, No. 6, pp. 7-19 (1998). Lately, this technique is in wider use in production of aircraft material and other materials that require good properties. An example is proposed in SAMPE Journal, Vol. 35, No. 3, pp. 58-63 (1999).

In widely known RTM processes, thermoplastic resin is injected under pressure into a reinforcing fiber substrate placed in a closed mold, or a reinforcing fiber substrate placed in an open mold is covered with a vacuum bag, followed by suction for resin injection, the latter process being called vacuum assisted resin transfer molding (VaRTM). Examples of VaRTM are proposed in documents such as U.S. Pat. No. 4,902,215A, U.S. Pat. No. 4,942,013A, and WO01/41993A2. It is reported that VaRTM is suitable for low cost production of large size fiber reinforced composite material.

A variety of thermosetting resins have been applied to RTM, but in particular, epoxy resin and bismaleimide resin are widely used in the field of aircraft manufacturing where high performance materials are essential, with particular importance attached to epoxy resin because of its high cost performance.

An epoxy resin composition to be used in RTM consists mainly of epoxy resin and a hardener, with other additives being added as required. Epoxy resin materials used as main component of an epoxy resin composition for RTM include general-purpose glycidyl ether of bisphenol A, general-purpose glycidyl ether of bisphenol F, novolac glycidyl ether as shown in U.S. Pat. No. 5,942,182A, glycidylamine-type epoxy resin as shown in Japanese Patent Laid-Open Publication (Kokai) HEI 03-050244, diglycidyl anilines as shown in Japanese Patent Laid-Open Publication (Kokai) HEI 03-050242, epoxy resin with a fluorine backbone as shown in U.S. Pat. No. 5,369,192A, epoxy resin with a naphthalene backbone as shown in Japanese Patent Laid-Open Publication (Kokai) HEI 09-137044, epoxy resin with a dicyclopentadiene backbone as shown in WO02/02666, and alicyclic epoxy resin as shown in WO01/92368A1.

Known hardeners generally used with epoxy resin in RTM processes include aliphatic polyamines, aromatic polyamines, acid anhydrides, and Lewis acid complexes. Hardeners widely used with an epoxy resin composition for producing fiber reinforced composite material in the field of aircraft manufacturing include, among others, aromatic polyamine, which is also used frequently as resin for RTM in this field.

Aromatic polyamine materials known to be widely used as resin for RTM include diethyl toluenediamines as shown in U.S. Pat. No. 5,688,877A and WO02/02666A1, aminobenzoic acid esters as shown in Japanese Patent Laid-Open Publication (Kokai) HEI 05-320480, 4,4'-diaminodiphenyl sulfones as shown in Japanese Patent Laid-Open Publication (Kokai) HEI 09-137044, alkyl derivatives of diaminodiphenyl methane as shown in WO02/02666A1, and aromatic diamines with a fluorene backbone as shown in U.S. Pat. No. 5,369,192A. In addition, liquid epoxy resin compositions for filament winding, that consist of glycidylamine type epoxy resin and diglycidyl aniline, plus either diaminodiphenyl sulfone or diaminodiphenyl methane, are disclosed in Japanese Patent Laid-Open Publication (Kokai) SHO 63-077926. Some of said diethyl toluenediamines, aminobenzoic acid esters, and alkyl derivatives of diaminodiphenyl methanes are liquid, while said diaminodiphenyl sulfones, diaminodiphenyl methanes, and aromatic diamines with a fluorene backbone are solid at room temperature.

There are two types, i.e. one part type and two parts type, of epoxy resin products for RTM that consist of an aromatic polyamine. A one part type resin product is a composition that comprises both epoxy resin and aromatic polyamine. For molding, said product is injected after being heated to an appropriate temperature. Since aromatic polyamines are relatively low in reactivity, compositions that consist of epoxy resin and aromatic polyamine can be stored for a relatively long period of time.

A two parts type resin product consists of an epoxy resin based liquid and an aromatic amine based liquid, which are stored separately and mixed to provide a resin composition for molding.

Fiber reinforced composite materials to be used in the field of aircraft manufacturing are generally required to be high in heat resistance. Cured epoxy resin is amorphous and has a glass transition temperature. Above the glass transition temperature, the rigidity of cured resin decreases greatly, resulting in deterioration of mechanical properties of the fiber reinforced composite material. Accordingly, the glass transition temperature of cured resin serves as an indicator of the heat resistance of the resulting fiber reinforced composite material. The glass transition temperature of cured thermosetting resin correlates with the highest temperature found in the heat history of the curing process. In the aerospace industry, curing conditions are frequently set up so that the maximum temperature during the process is about 180° C. ° C.

To use such a high curing temperature of about 180° C., however, molds and other tools have to be resistant to such heat, which increases the required costs. An effective way to reduce the costs for molds and tools is to perform precure at a relatively low temperature in the range of about 80° C. to 140° C., and after demolding, carry out aftercure of the resulting fiber reinforced composite material at about 180° C. In the VaRTM process which requires a vacuum bag, in particular, a low cure temperature makes it possible to use low-price film for vacuum bag, suggesting that low-temperature precure brings highly desirable results.

The reactivity of epoxy resin and aromatic polyamine is relatively low, and cuing at a low temperature will require a longer cure time. So, a catalyst is added to improve the cure cycle. Suitable catalysts for this purpose include $BF_3$.amine complexes as shown in WO01/92368A1, sulfonium salts as shown in U.S. Pat. No. 4,554,342A and Japanese Patent Laid-Open Publication (Kokai) 2002-003581, alkyl esters of strong acids as shown in U.S. Pat. No. 5,688,877A, and polyphenolic compounds as shown in U.S. Pat. No. 4,593,056A.

A two parts type epoxy resin composition is preferred when a catalyst is used. It is because, while the shelf life a one part type epoxy resin composition shortens if a catalyst is added, such a problem can be avoided if a two parts type epoxy resin composition is used. Cured products of epoxy resin compositions designed for production of fiber reinforced composite material to be used in the aerospace industry are required to have many good properties. In addition to the above-mentioned high glass transition temperatures, they should preferably be high in elastic modulus, high in toughness, poor in the glass temperature decrease caused by water absorption (or high in resistance to moist heat), and small in the coefficient of linear expansion. Such aromatic polyamines as 4,4'-diaminodiphenyl sulfone and 3,3'-diaminodiphenyl sulfone can serve to produce cured products with such good properties as small coefficient of linear expansion and high heat resistance, and therefore they are widely used as hardeners to cure epoxy resin compositions for prepreg production in the aerospace industry. However, since diaminodiphenyl sulfones are solid with a high melting point, they are not used in two parts type epoxy resin composition products. It is not impossible in theory to design a batch comprising a solid hardener, but this is not practical because a continuous mixer cannot be applied. Thus, difficulty of using high-performance components has been a major problem with conventional two parts type epoxy resin composition products. Another serious problem with conventional epoxy resin composition products for RTM is trade-off between low viscosity and good properties of cured products. Injection under a relatively high pressure can be performed in the RTM process which uses a closed mold, but the VaRTM process needs a low viscosity at the time of injection because the process uses atmospheric pressure for injection, requiring a considerably low viscosity to carry out impregnation. If precure at 80° C.-140° C. is assumed, furthermore, the inlet temperature has to be set to 40° C.-90° C. An epoxy resin composition to be used should preferably have a viscosity of 500 MPa·s or less at an inlet temperature in this temperature range. Conventional epoxy resin composition products for RTM that can provide cured products with good properties, however, are generally high in viscosity and have to be injected at a high temperature, and therefore, they are not suitable for VaRTM and other low cost processes for which low temperature injection is preferred. A conventional technique that incorporates high temperature injection is shown in International SAMPE Technical Conference, Vol. 31, pp. 296-306 (2000). Said technique uses a mold temperature of 180° C. at the time of injection.

Under such situations, there have been expectations for development of an epoxy resin composition for RTM that has an initial viscosity of 500 MPa·s or less at an inlet temperature in the range of 40° C.-90° C., can be precured at 80° C.-140° C., and can form a cured products that are high in glass transition temperature, elastic modulus and toughness while being small in the glass temperature decrease caused by water absorption and also small in the coefficient of linear expansion.

SUMMARY OF INVENTION

The purpose of the present invention is to provide a liquid epoxy resin composition for low cost production of high performance fiber reinforced composite material, that has a low viscosity at relatively low temperatures, and that after being cured, the cured product is high in glass transition temperature, elastic modulus and toughness while being small in the glass temperature decrease caused by water absorption and also small in the coefficient of linear expansion; and to provide a method to produce fiber reinforced composite material therefrom.

The term "epoxy resin" is generally used to refer to either a category of thermosetting resins or a category of chemical substances having two or more 1,2-epoxy groups within the molecule, but the latter definition should be applied to the following descriptions.

Moreover, the term "epoxy resin composition" refers to a composition consisting of an epoxy resin and a hardener, as well as other additives as required.

The first epoxy resin composition of the present invention comprises the following components (1)-(3) as essential components, their mixing ratios meeting the following conditions (I)-(IV), and component (3) being dissolved homogeneously:

Component (1): epoxy resin that is liquid at room temperature,

Component (2): aromatic polyamine that is liquid at room temperature,

Component (3): diaminodiphenylsulfone,

Condition (I): The proportion of component (1) relative to the entire epoxy resin in the composition is 60-100 wt %, Condition (II): The sum of the proportions of components (2) and (3) relative to the entire polyamine in the composition is 70-100 wt %, Condition (III): The proportion of component (3) relative to the entire polyamine in the composition is 25-60 wt %, and Condition (IV): The stoichiometric ratio of the entire polyamine to the entire epoxy resin in the composition is 0.7-1.3.

In the above definition, component (2) does not contain component (3).

Said epoxy resin composition should preferably be produced by mixing the following two liquids.

Liquid (A1): a liquid that consists of component (1).

Liquid (B1): a liquid that consists of components (2) and (3), and contains component (3) dissolved homogeneously.

Liquid (B) should preferably be free of precipitation of component (3) after being stored for 30 days at 5° C. To realize this, component (3) should preferably consist of 3,3'-Diaminodiphenylsulfone, and 4,4'-diaminodiphenylsulfone. This is because a solution of the two isomers is much stabler than a solution of only one isomer. Component (2) should preferably be diethyl toluenediamine, which is low in viscosity, because it serves to lower the viscosity of the composition.

In addition, said epoxy resin composition should, after being cured for two hours at 180° C., preferably have a glass transition temperature of 170° C. or more and a coefficient of linear expansion of $7 \times 10^{-5} K^{-1}$ or less in the temperature range of 30° C. to 160° C. Fiber reinforced composite material can be high in tensile strength if its coefficient of linear expansion is in the above-mentioned range.

To have good impregnation properties, said epoxy resin composition should preferably have an initial viscosity of 1-500 MPa·s at 80° C., and after being left to stand for one hour at 80° C., should preferably have a viscosity not more than four times the initial viscosity. Moreover, to enable precure at a relatively low temperature, material produced by curing for two hours at 130° C. should preferably have a glass transition temperature of 120° C. or more.

To achieve such viscosity stability and ability for low temperature curing, said epoxy resin composition should preferably contain an accelerator selected from the group of strong acid ester, onium salt, Lewis acid.amine complex, and polyphenol.

The second epoxy resin composition of the present invention is an epoxy resin composition for production of fiber reinforced composite material, that contains at least the following components (4)-(6), forms a cured product with a theoretical molecular weight between crosslinking points in the range of 250-350 g/mol, and has an initial viscosity at 80° C. of 1-500 MPa·s.

(4): aromatic epoxy resin with tri- or higher functionality (5): aromatic epoxy resin with di-functionality (6): aromatic polyamine Here, the molecular weight between crosslinking points is defined as the weight of the entire cured epoxy resin divided by the number of crosslinking points contained in the entire cured epoxy resin. A cured product should have a theoretical molecular weight between crosslinking points to be in said range, in order to be high in both heat resistance and toughness.

Here, component (4) should preferably be at least one selected from the group of N,N,N',N'-tetraglycidyl-4,4'-diaminodiphenyl methane, N,N,O-triglycidyl-m-aminophenol, N,N,O-triglycidyl-p-aminophenol, alkyl-substituted derivatives of the foregoing substances, and N,N,N',N'-tetraglycidyl-m-xylene diamine.

Suitable epoxy resins as component (5) include polyglycidyl ethers in the form of a condensation product of phenol or a substituent derivative thereof and dicyclopentadiene, dihydroxynaphthalene diglycidyl ether, diglycidyl ether of dihydroxybiphenyl or its substituent derivative, diglycidyl ether of 9,9-bis(4-hydroxyphenyl)fluorine, and polyglycidyl ether of phenol aralkyl resin.

Said epoxy resin compositions should, after being cured for two hours at 180° C., preferably have a flexural modulus of 3.3-4.5 GPa at 25° C. and a glass transition temperature of 170° C. or more.

The third epoxy resin composition of the present invention is an epoxy resin composition for production of fiber reinforced composite material, that consists of a polyglycidyl ether of phenol aralkyl resin, and a polyamine.

The fourth epoxy resin composition of this invention is an epoxy resin composition for production of fiber reinforced composite material, that consists of an epoxy resin and an aromatic polyamine, has an initial viscosity is in the range of 1-500 MPa·s at 80° C., and after being cured for two hours at 180° C., forms a cured product having a glass transition temperature of 130° C. or more after being immersed in boiling water for 48 hours.

Said epoxy resin composition should, after being cured for two hours at 180° C., preferably have a flexural modulus of 2.3 GPa or more at 82° C.

By meeting these requirements, the resulting fiber reinforced composite material comprising a cured product of said epoxy resin composition as matrix can have a high compressive strength in wet heat.

The fifth epoxy resin composition of the present invention is characterized in that it is produced by mixing the following two liquids.

Liquid (A3): the following component (9) and component (10).

Liquid (B3): a liquid that consists of aromatic polyamine.

Component (9): at least one epoxy resin selected from the group of N,N,N',N'-tetraglycidyl-4,4'-diaminodiphenyl methane and alkyl-substituted derivatives thereof.

Component (10): at least one epoxy resin selected from the group of N,N-diglycidyl aniline and alkyl-substituted derivatives thereof.

In said epoxy resin composition, components (9) and (10) should preferably account for 30-90 wt % and 10-30 wt %, respectively, of the entire epoxy resin.

Said epoxy resin composition is characterized in that, after being cured, the cured product suffers little glass transition temperature decrease due to water absorption.

The production method for fiber reinforced composite material according to the present invention is characterized in that reinforcing fiber is impregnated with one of said epoxy resin compositions and then cured by heating. The production method for fiber reinforced composite material according to the present invention should preferably consist of impregnating reinforcing fiber with one of said epoxy resin compositions at a temperature in the range of 40-90° C., followed by precure at a temperature in the range of 80° C.-140° C. and aftercure at a temperature in the range of 170-190° C.

The fiber reinforced composite material of the present invention consists of a cured product of said epoxy resin composition, and reinforcing fiber. In the fiber reinforced composite material of the present invention, said reinforcing fiber should preferably account for 50-85% by volume.

BEST MODE FOR CARRYING OUT THE INVENTION

The epoxy resin composition for production of fiber reinforced composite material according to the present invention is a liquid epoxy resin composition that consists of epoxy resin and aromatic amine.

The epoxy resin composition according to the present invention should preferably be produced by mixing the following two liquids.

(A) a liquid comprising epoxy resin (B) a liquid comprising aromatic amine

Separate storage of liquids (A) and (B) has the advantage that a much longer shelf life can be achieved compared with storing all components as a mixture. This is particularly a large advantage when an accelerator is included, as described later. A long shelf life can be achieved if either liquid (A) or (B) is solid, but a continuous mixer can work more efficiently if both are liquid.

To achieve good impregnation properties at relatively low temperatures, the epoxy resin composition for production of fiber reinforced composite material according to the present invention should preferably have an initial viscosity in the range of 1-500 mPa·s at 80° C. Since this requires a long pot life, said composition s after being left to stand for one hour at 80° C. should preferably have a viscosity not more than four times the initial viscosity, more preferably a viscosity in the range of 1-1000 MPa·s after being left to stand for one hour at 80° C.

Aromatic polyamine to be used in the epoxy resin composition according to the present invention may be a single component material that is liquid at room temperature, or may be a mixture. Said mixture may contain, as a component, an aromatic amine that is solid at room temperature, but the mixture should be liquid at room temperature.

Here, room temperature is defined as 25° C. The terms "liquid" and "solid" used hereinafter refer to properties at 25° C. unless otherwise specified.

When a mixture containing a solid aromatic polyamine as a component is used, said mixture should preferably contain at least one solid aromatic polyamine as another component. It is not impossible to produce a liquid mixture by mixing two or more solid aromatic polyamines, but it is difficult in most cases.

Liquid aromatic polyamines suitable for production of epoxy resin according to the present invention include: diethyl toluenediamine (a mixture consisting mainly of 2,4-diethyl-6-methyl-m-phenylenediamine and 4,6-diethyl-2-methyl-m-phenylenediamine),

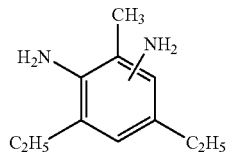

bis(methylthio)toluenediamine,

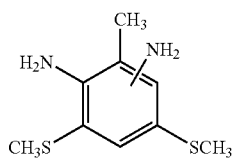

2,2'-diisopropyl-6,6'-dimethyl-4,4'-methylenedianiline,

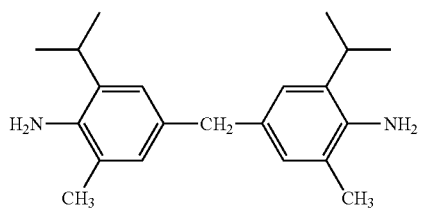

2,2',6,6'-tetraisopropyl-4,4'-methylenedianiline,

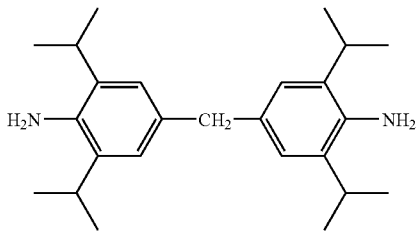

2,2'-diethyl-4,4'-methylenedianiline, and

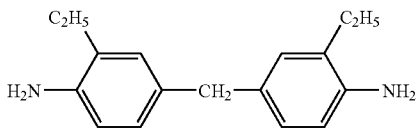

polyoxytetramethylene bis(p-aminobenzoate).

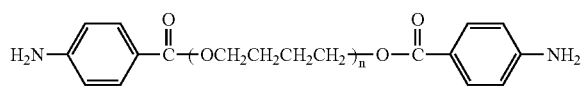

Of these, diethyl toluenediamine is preferred most because it is low in viscosity and can form a cured product with preferred properties including glass transition temperature.

The epoxy resin composition according to the invention should preferably contain diaminodiphenylsulfone as a solid aromatic polyamine component. Diaminodiphenylsulfone, particularly the major isomers of 4,4'-diaminodiphenylsulfone, and

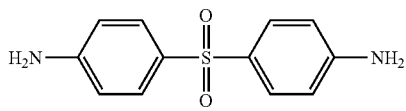

3,3'-diaminodiphenylsulfone

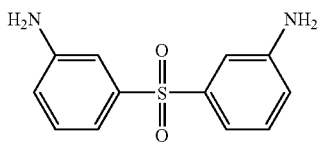

has preferred features such as ability to form a cured product with a high heat resistance and a small coefficient of linear expansion. Diaminodiphenylsulfone, however, is easily precipitates into crystal as it is left to stand for a long time at a low temperature, even after being mixed with a liquid aromatic polyamine at a high temperature. Of the two isomers, 3,3'-diaminodiphenylsulfone is slower in crystallization. However, a liquid mixture consisting of the two isomers and a liquid aromatic polyamine is preferred because it is much slower in crystallization than a mixture consisting of one isomer and a liquid aromatic polyamine.

The epoxy resin composition according to the invention may contain, as an optional component, a solid aromatic polyamine other than diaminodiphenylsulfones.

Preferred solid aromatic polyamines include: 4,4'-diaminodiphenyl methane,

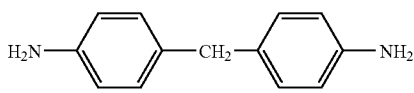

9,9-bis(4-aminophenyl)fluorine,

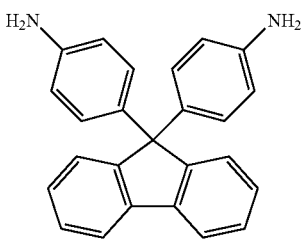

1,1-bis(4-aminophenyl)cyclohexane,

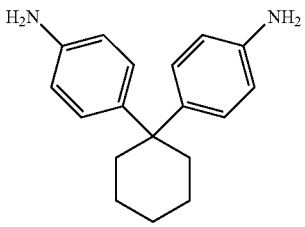

bis(4-(3-aminophenoxy)phenyl)sulfone, and

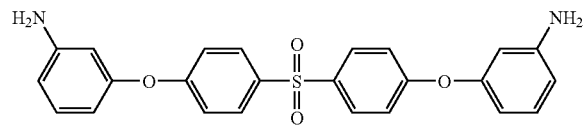

bis(4-(4-aminophenoxy)phenyl)sulfone.

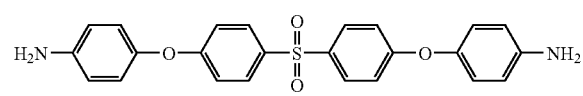

Bis(4-(3-aminophenoxy)phenyl)sulfone is particularly preferred because it is slow in crystallization when used in combination with 4,4'-diaminodiphenylsulfone and 3,3'-diaminodiphenylsulfone.

The epoxy resin composition according to the invention may contain an aliphatic polyamine as an optional component.

In the epoxy resin composition according to the invention, liquid aromatic polyamine and diaminodiphenylsulfone combined should preferably account for 70-100 wt % of the entire polyamine.

In the epoxy resin composition according to the invention, diaminodiphenylsulfone should preferably account for 25-60 wt % of the entire polyamine. Good features such as high coefficient of linear expansion are not developed if the proportion of diaminodiphenylsulfone is less than 25 wt %, while crystallization can take place easily if it exceeds 60 wt %.

If both 4,4'-diaminodiphenylsulfone and 3,3'-diaminodiphenyl-sulfone are used, their ratio by weight should preferably be 10:90 to 90:10 to depress their crystallization.

The epoxy resin composition according to the invention should, after being cured for two hours at 180° C., preferably have a coefficient of linear expansion of $7 \times 10^{-5} K^{-1}$ or less in the range of 30° C. to 160° C.

Since the coefficient of linear expansion of carbon fiber, which is widely used as reinforcing fiber, is extremely small, the preferred lower limit of the coefficient of linear expansion is theoretically zero, but practically it is about $5 \times 10^{-5} K^{-1}$.

An epoxy resin to be used for production of the epoxy resin composition according to the invention may be a single component material that is liquid at room temperature, but also may be a mixture. Said mixture may contain an epoxy resin that is solid at room temperature, but the mixture itself should be liquid at room temperature.

A large variety of epoxy resins are used in different industries, but aromatic epoxy resins are preferred to produce cured products with a high glass transition temperature and elastic modulus. Thus, the epoxy resin composition according to the invention should preferably contain at least one aromatic epoxy resin. In addition, the epoxy resin composition according to the invention should preferably be used in combination with an aromatic epoxy resin with tri- or higher functionality and another aromatic epoxy resin with di- or higher and lower than tri-functionality.

Practical examples of preferred epoxy resins are shown below. Most epoxy resin products are mixtures of isomers and oligomers with different molecular weights, and accordingly the structure given below represents only the major component.

Preferred epoxy resins with tri- or higher functionality include: N,N,N',N'-tetraglycidyl-4,4'-diaminodiphenyl methane (liquid at room temperature),

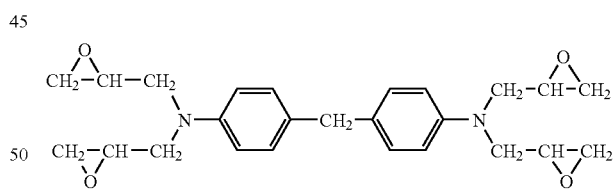

N,N,N',N'-tetraglycidyl-3,3'-diethyl-4,4'-diaminodiphenyl methane (liquid at room temperature),

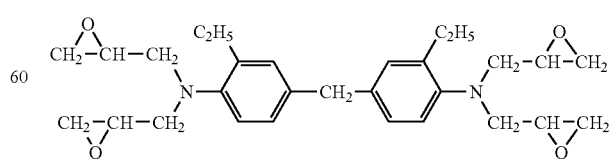

N,N,O-triglycidyl-m-aminophenol (liquid at room temperature).

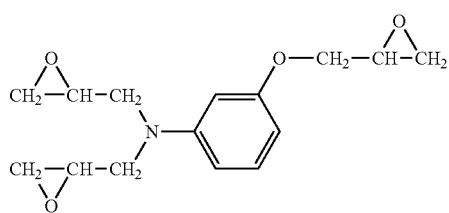

N,N,O-triglycidyl-p-aminophenol (liquid at room temperature),

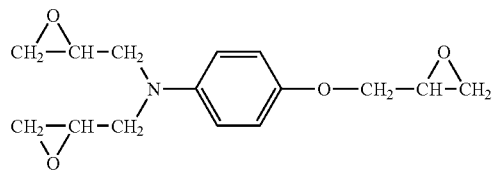

N,N,O-triglycidyl-p-aminocresol (liquid at room temperature), and

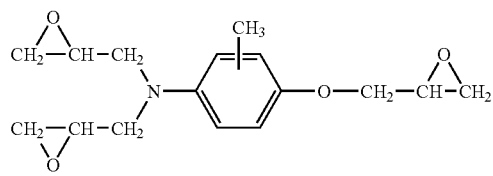

N,N,N',N'-tetraglycidyl-m-xylenediamine (liquid at room temperature).

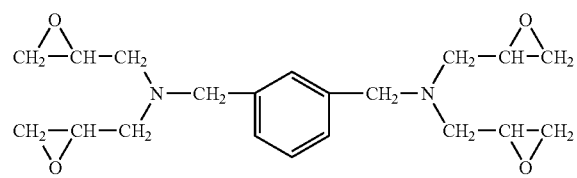

Preferred di-functional epoxy resins include:

diglycidyl ether of bisphenol A (liquid or solid at room temperature),

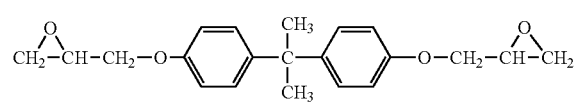

diglycidyl ether of bisphenol F (liquid or solid at room temperature),

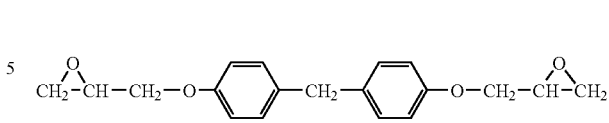

diglycidyl ether of bisphenol AD (liquid at room temperature),

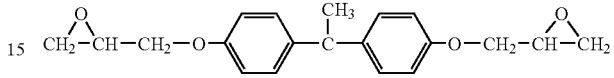

diglycidyl ether of bisphenol S (solid at room temperature),

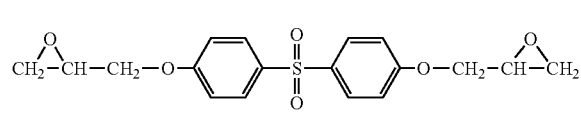

diglycidyl ether of tetrabromobisphenol A (solid at room temperature),

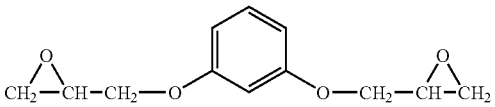

diglycidyl ether of tetramethylbisphenol F (solid at room temperature),

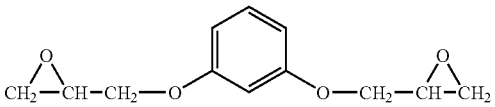

diglycidyl ether of 4,4'-dihydroxydiphenyl sulfide (solid at room temperature),

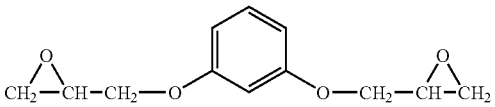

resorcinol diglycidyl ether (solid at room temperature), diglycidyl ether of 2,5-di-tert-butylhydroquinone (solid at room temperature),

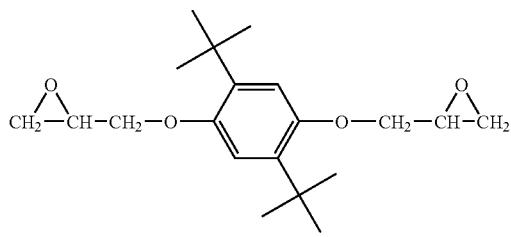

diglycidyl ether of 1,6-dihydroxynaphthalene (liquid or solid at room temperature),

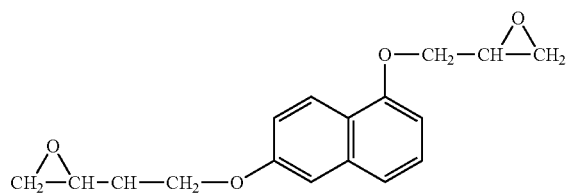

diglycidyl ether of 4,4'-dihydroxybiphenyl (solid at room temperature),

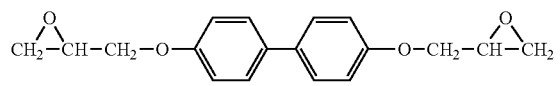

diglycidyl ether of 3,3',5,5'-tetramethyl-4,4'-dihydroxybiphenyl (solid at room temperature),

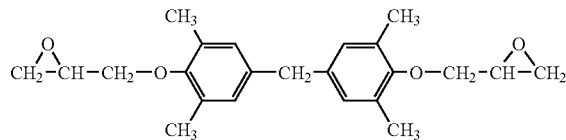

diglycidyl ether of 9,9-bis(4-hydroxyphenyl)fluorene (solid at room temperature),

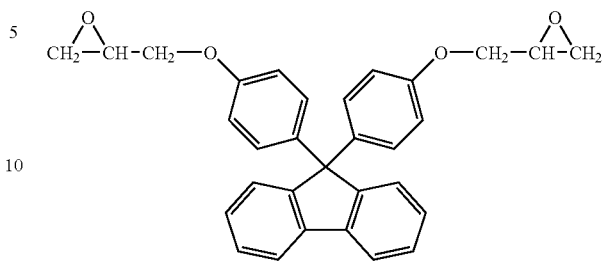

N,N-diglycidyl aniline (liquid at room temperature),

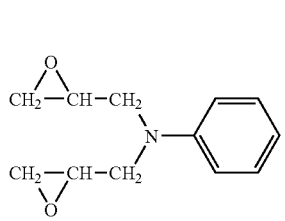

N,N-diglycidyl-o-toluidine (liquid at room temperature),

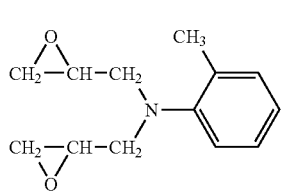

epoxy resin having an oxazolidone ring which is produced by reaction of two molecules of a diglycidyl ether of bisphenol A with one molecule of tolylene diisocyanate (solid at room temperature),

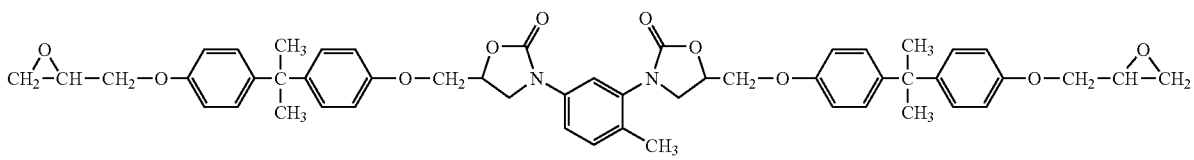

diglycidyl ethers in the form of a condensation product of two molecules of 2,6-xylenol and one molecule of dicyclopentadiene (solid at room temperature),

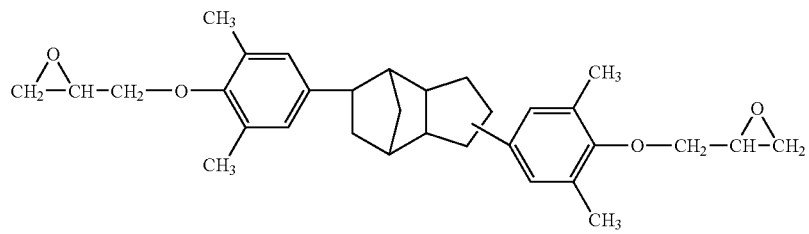

diglycidyl phthalate (liquid at room temperature), and

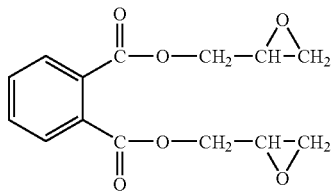

diglycidyl terephthalate (solid at room temperature),

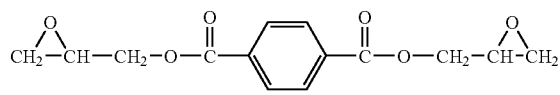

Epoxy resins having di- or higher and lower than tri-functionality include condensation products of formaldehyde and phenol or its substituent derivative, that is, novolac polyglycidyl ether (normally solid at room temperature).

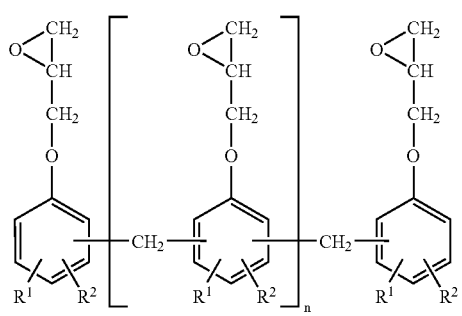

where, $R^1$ and $R^2$ denote a hydrogen atom, an alkyl group having 1-8 carbon atoms, or a halogen atom, and n denotes a real number of 0 or more and less than 1, polyglycidyl ethers in the form of a condensation product of dicycolpentadiene and phenol or its substituent derivative (normally solid at room temperature)

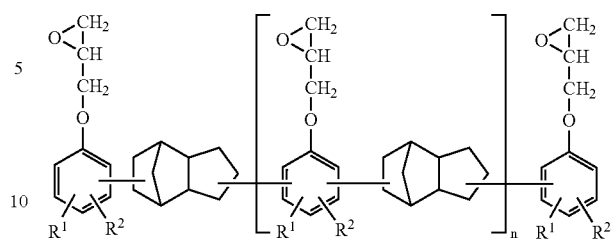

where, $R^1$ and $R^2$ denote a hydrogen atom, an alkyl group having 1-8 carbon atoms, or a halogen atom, and n denotes a real number of 0 or more and less than 1, polyglycidyl ether of phenol aralkyl resin (normally solid at room temperature)

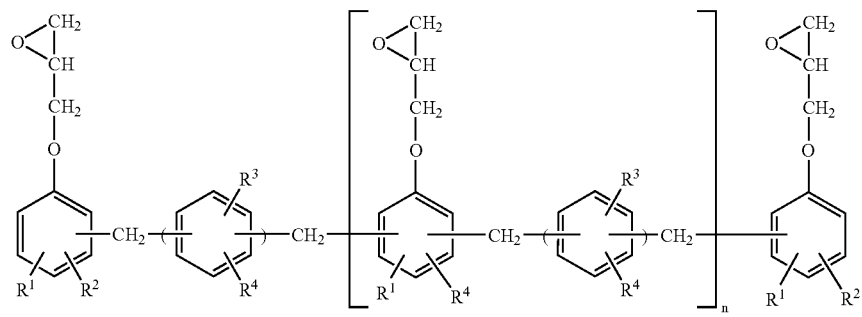

where, $R^1$, $R^2$, $R^3$ and $R^4$ denote a hydrogen atom, an alkyl group having 1-8 carbon atoms, or a halogen atom, and m and n denote an integer of 1-4 and a real number of 0 or more and less than 1, respectively. The epoxy resin composition according to the invention can contain, as an optional component, an aliphatic epoxy resin, in addition to said aromatic epoxy resins.

Preferred aliphatic epoxy resins include 3,4-epoxycyclohexyl-methyl-3,4-epoxycyclohexanecarboxylate, bis(2,3-epoxycyclopentyl)ethers, diglycidyl hexahydrophthalate, and neopentylene glycol diglycidyl esters. The reactivity will be low, however, if the mixing ratio of 3,4-epoxycyclohexylmethyl-3,4-epoxy-cyclohexanecarboxylate, which contains an epoxycyclohexane ring, or a bis(2,3-epoxycyclopentyl) ether is large. In particular, it is necessary to add an accelerator as described below, if 3,4-epoxycyclohexylmethyl-3,4-epoxycyclohexanecarboxylate is used. Diglycidyl hexahydrophthalate, and diglycidyl ether of neopentylene glycol, which contain a diglycidyl group, have an appropriate reactivity, but the glass transition temperature of their cured products decreases as their mixing rate increases. Accordingly, the mixing rate of these aliphatic epoxy resins should preferably be 30 wt % or less relative to the entire epoxy resin. One of the purposes of the present invention is to allow the resulting cured product to have a sufficiently high glass transition temperature in addition to sufficiently high elongation and toughness.

After being cured for two hours at 180° C., the epoxy resin according to the invention should preferably have a glass transition temperature of 170° C. or more, more preferably 180° C. or more. Cured products of the epoxy resin composition obtained by curing for two hours at 180° C. should preferably have an elongation of 4% or more, more preferably 5% or more.

To achieve said preferred glass transition temperature and elongation, said cured products of the epoxy resin composition according to the invention should preferably have a theoretical molecular weight between crosslinking points, α, in the range of 250-350 g/mol. Here, the theoretical molecular weight between crosslinking points, α, is defined as the weight of the cured epoxy resin, W, divided by the theoretical number of crosslinking points in the cured epoxy resin, and it is known to be inversely proportional to the crosslink density of the cured product and negatively correlated with the glass transition temperature and elastic modulus. If the theoretical molecular weight between crosslinking points is less than 250 g/mol, the resulting cured epoxy resin will be so high in crosslink density, possibly making said cured epoxy resin low in elongation and toughness, though high in heat resistance, which in turn will result in fiber reinforced composite material low in tensile strength, compression strength after impact, and fatigue resistance. If the theoretical molecular weight between crosslinking points is larger than 350 g/mol, on the other hand, the crosslink density will be too small, possibly making the resulting cured epoxy resin low in glass transition temperature, which in turn will result in fiber reinforced composite material with poor mechanical heat resistance.

The theoretical molecular weight between crosslinking points, α, can be determined by calculation as described below based on the weight of the cured epoxy resin, W (grams).

It is assumed first that the epoxy resin composition concerned consists of n types of epoxy resin components and that the i'th epoxy resin component has a weight of ai (grams). If it is further assumed that the epoxy resin composition contains one polyamine component and that the j'th polyamine component has a weight of $b_j$ (grams), then the weight of the cured epoxy resin, W, is expressed by expression (1):

$$W = \sum_{i=1}^{n} a_i + \sum_{j=1}^{l} b_j \tag{1}$$

If the mixing ratio of epoxy resin and that of polyamine are stoichiometrically equivalent, that is, if the number of moles of the epoxy groups contained in the epoxy resin composition is equal to that of the active hydrogen atoms, the theoretical number of crosslinking points, C, in the cured epoxy resin can be calculated as follows. It is assumed here that $E_i$ (g/eq) denotes the epoxy equivalent weight of the i'th epoxy resin component and that $x_i$ denotes the number of the epoxy groups contained in one molecule of the i'th epoxy resin component. If it is further assumed that the j'th polyamine component in the epoxy resin composition has an active hydrogen equivalent weight of $H_j$ (g/eq) and that $y_j$ denotes the number of active hydrogen atoms contained in one molecule of the j'th polyamine component, the total amount of crosslinking points, C (moles), contained in the cured epoxy resin is calculated by expression (2) if all epoxy groups have reacted with all active hydrogen atoms in the polyamine.

$$C = \sum_{i=1}^{n} \left\{ \frac{a_i}{E_i \times x_i} \times (x_i - 2) \right\} + \sum_{j=1}^{l} \left\{ \frac{b_j}{H_j \times y_j} \times (y_j - 2) \right\} \tag{2}$$

In expression (2), $E_i \times x_i$ and $H_j \times y_j$ represent the average molecular weight of i'th epoxy resin component and the average molecular weight of the j'th polyamine component, respectively. Further, $(x_i-2)$ and $(y_j-2)$ represent the number of crosslinking points produced from one molecule of the i'th epoxy resin component, and the number of crosslinking points produced from one molecule of the j'th polyamine component, respectively.

For most commercial chemicals, the active hydrogen equivalent weight of polyamine products and the epoxy equivalent weight of epoxy resin products are available from their manufacturers. Even if the equivalent weight of a product is unknown, it can be calculated based on the structural formula if the product is pure material, or it can be determined from titration if the product is a mixture. If the mixing ratios of the epoxy resin and the polyamine are not stoichiometrically equivalent, the entire amount of crosslinking points, C, is calculated as follows.

First, the mixing ratio index, β, is determined by expression (3) for the epoxy resin and the polyamine.

$$\beta = \frac{\sum_{j=1}^{l} \frac{b_j}{H_j}}{\sum_{i=1}^{n} \frac{a_i}{E_i}} \tag{3}$$

If β>1, which indicates that the amount of polyamine is stoichiometrically excessive, the entire amount of crosslinking points, C, is calculated by expression (4).

$$C = \sum_{i=1}^{n} \left\{ \frac{a_i}{E_i \times x_i} \times (x_i - 2) \right\} + \frac{1}{\beta} \times \sum_{j=1}^{l} \left\{ \frac{b_j}{H_j \times y_j} \times (y_j - 2) \right\} \tag{4}$$

If β<1, which indicates that the amount of epoxy resin is stoichiometrically excessive, the entire amount of crosslinking points, C, is calculated by expression (5).

$$C = \beta \times \sum_{i=1}^{n} \left\{ \frac{a_i}{E_i \times x_i} \times (x_i - 2) \right\} + \sum_{j=1}^{l} \left\{ \frac{b_j}{H_j \times y_j} \times (y_j - 2) \right\} \tag{5}$$

For the epoxy composition according to the present invention, the stoichiometric ratio, β, of the entire polyamine to the entire epoxy resin should preferably be in the range of 0.7-1.3. If the ratio is outside the range, the heat resistance and the elastic modulus of the cured product will be unfavorably low.

To produce a resin composition that can form a cured product with a theoretical crosslink density in said preferred range and a glass transition temperature in said preferred range, an effective way is to use an epoxy resin that consists of a rigid backbone and a small number of, preferably two or more and less than three, functional groups.

Preferred epoxy resins for this purpose include polyglycidyl ethers in the form of a condensation product of dicycolpentadiene and phenol or its substituent derivatives, diglycidyl ether of dihydroxynaphthalene, diglycidyl ether of dihydroxybiphenyl or its substituent derivatives, diglycidyl ether of 9,9-bis(4-hydroxy-phenyl)fluorine, and polyglycidyl ethers of phenol aralkyl resin. In particular, polyglycidyl ethers of phenol aralkyl resin are highly preferred because they have a large epoxy equivalent weight and can form a cured product with high heat resistance.

Of the commercial polyglycidyl ethers of phenol aralkyl resin, those epoxy resin products which have a biphenyl backbone as shown by the following expression are particularly preferred in terms of epoxy equivalent weight and heat resistance of their cured products.

Rather, a more effective way may be to prevent the glass transition temperature from being decreased by water absorption. Specifically, a way to prevent the glass transition temperature from being decreased by water absorption is to use, as said epoxy resin component with tri- or higher functionality, at least one epoxy resin selected from the group of N,N,N',N'-tetra-glycidyl-4,4'-diaminodiphenylmethane and its alkyl-substituted derivatives, in combination with at least one epoxy resin selected from the group of N,N-diglycidyl aniline and its alkyl-substituted derivatives as said epoxy resin component with di- or higher and lower than tri-functionality.

Here, said epoxy resin selected from the group of N,N,N',N'-tetraglycidyl-4,4'-diaminodiphenylmethane and its alkyl-substituted derivatives should preferably account for 30-90 wt % of the entire epoxy resin, while said epoxy resin selected

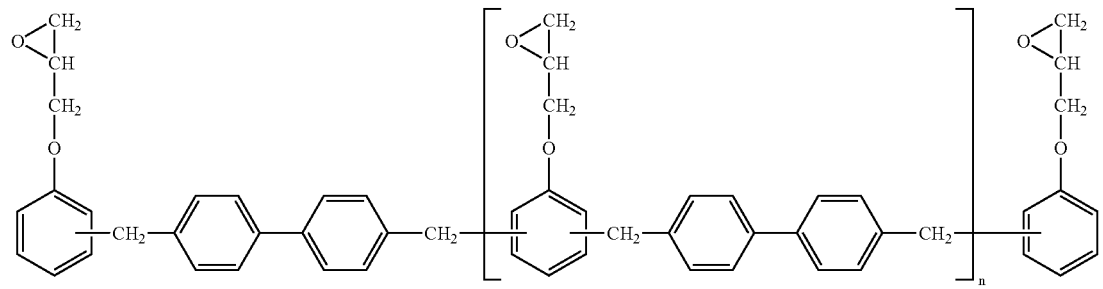

Polyglycidyl ethers of phenol aralkyl resin are useful not only as a component of an epoxy resin composition that uses liquid aromatic polyamine as hardener, but also as a component of an epoxy resin composition for fiber reinforced composite material that uses polyamine as hardener. Specifically, they include resin compositions for prepreg production that consist of a polyglycidyl ether of phenol aralkyl resin, other epoxy resin components such as diglycidyl ether of bisphenol A and N,N,N',N'-tetra-glycidyl-4,4'-diaminodiphenylmethane, a solid aromatic polyamine such as diaminodiphenylsulfone, and a thermoplastic resin, as an optional component, such as polyethersulfone; and liquid resin compositions for RTM, filament winding and hand lay-up that consist of a polyglycidyl ether of phenol aralkyl resin, other epoxy resin components such as diglycidyl ether of bisphenol A, and liquid aliphatic polyamine, such as isophoron diamine and 4,4'-methylenebis(2-methylcyclohexane amine), as hardener.

Epoxy resin compositions for fiber reinforced composite material to be used in the aerospace industry are required to be small in the decrease in glass transition temperature caused by water absorption, as well as able to form a cured product with a high glass transition temperature. Accordingly, the epoxy resin composition according to the invention should, after being cured for two hours at 180° C. and immersed in boiling water for 48 hours, preferably have a glass transition temperature of 130° C. or more.

To produce a cured product that maintains a high glass transition temperature after immersion for 48 hours in boiling water, it is generally effective to design the constitution so that the cured product in a dry state has a high glass transition temperature, but this is not always easy with a resin composition that has a theoretical crosslink density in said preferred range and can form a cured product with a sufficiently high elongation.

from the group of N,N-diglycidyl aniline and its alkyl-substituted derivatives should preferably account for 10-30 wt % of the entire epoxy resin.

The epoxy resin composition according to the invention should preferably be able to be precured at a relatively low temperature in the rage of 80° C.-140° C.

Resin that consists of said preferred aromatic epoxy resin and said preferred aromatic polyamine can be subjected to precure of, for instance, about four hours at 130° C.

Some accelerator is required, however, if precure is to be completed in a shorter period of time or at a lower temperature.

There are two types, i.e. acid type and base type, of accelerators for epoxy resin compositions that use a polyamine hardener, of which acid type ones work effectively when aromatic polyamine is used as hardener while base type ones such as imidazole derivatives and urea derivatives do not work effectively.

In addition to the ability for precure in a short period of time or at a low temperature, an accelerator is also required to have a sufficiently long pot life at the inlet temperature without rapid suffering viscosity increase or rapid gelation.

Specifically, when the epoxy resin composition according to the invention contains an accelerator, said composition should, after being left to stand for one hour at 80° C., preferably have a viscosity not more than four times the initial viscosity, and the cured product produced by curing for two hours at 130° C. should preferably have a glass transition temperature of 120° C. or more.

Acid type accelerators suitable for this purpose include strong acid esters, onium salts, Lewis acid-amine complexes, and polyphenols. Preferred strong acid esters include methyl p-toluenesulfonate and propyl p-toluenesulfonate. Preferred onium salts include p-acetoxyphenyl dimethylsulfonium hexafluorophosphate, p-acetoxyphenyl benzylmethylsulfonium hexafluorophosphate, and p-acetoxyphenyl dibenzylsulfonium hexafluorophosphate. Preferred Lewis acid.amine complexes include $BF_3$.piperidine complex. Preferred polyphenols include substituent derivatives of catechol such as 4-tert-butylcatechol and propyl gallate.

The method for fiber reinforced composite material according to the present invention consists of impregnation of reinforcing fiber with said epoxy resin composition, followed by heating for curing.

The method for fiber reinforced composite material according to the present invention should preferably be carried out by injecting said liquid epoxy resin composition into a reinforcing fiber substrate placed in a mold, followed by curing to provide fiber reinforced composite material, such a process being called resin transfer molding (RTM).

Preferred reinforcing fibers include carbon fiber, glass fiber, aramid fiber, and metal fiber, which may be used solely or in combination. Carbon fiber is particularly preferred as material for aircraft and spacecraft. Said reinforcing fiber substrate may be fabric, braid, or mat of reinforcing fiber, or a preform produced by lamination and arrangement thereof followed by fixing their configuration with a tackifier or by stitching.

Said mold may be a closed mold made of rigid material, or an open mold made of rigid material which is used in combination with flexible film (bag). In the latter case, reinforcing fiber is placed between said open mold made of rigid material and said flexible film.

Preferred rigid materials for molds include metal (steel, aluminum, INVAR, etc.), FRP, wood, gypsum, and other known materials. Preferred materials for said flexible film include nylon, fluorocarbon resin, and silicone resin.

When a closed mold made of rigid material is used, the mold is usually closed under pressure and then an epoxy resin composition is injected under pressure. In such a case, an outlet may be provided in addition to the inlet to allow suction to be performed by appropriate means such as vacuum pump. When suction is performed, epoxy resin may be injected only under atmospheric pressure without using special pressurization means.

When an open mold made of rigid material is used with flexible film, an outlet is usually provided and suction is performed by such means as vacuum pump to allow injection to be achieved under atmospheric pressure, such a method being called VaRTM. As in the case of the CAPRI method quoted in WO01/41993A2, the inlet pressure may be adjusted to a value that is lower than atmospheric pressure. The use of a resin distribution medium as shown in U.S. Pat. No. 4,902,215 is effective to achieve good impregnation by injection under a pressure not higher than atmospheric pressure.

A form core, honeycomb core, metal component, etc., may be placed in combination with reinforcing fiber in a mold to produce integrated composite material. In particular, a sandwich structure produced by placing reinforcing fiber on both sides of a form core or a honeycomb core, followed by molding, is useful because it is lightweight and has a high flexural rigidity.

Further, the surface of said rigid mold may be provided with a gel coat prior to placing reinforcing fiber in the mold.

Epoxy resin composition may be in the from of a single liquid containing all components, which is injected from a single container; in the form of two liquids, A and B, which are stored in separate containers and injected after being combined in a mixer; or in the form of two liquids, A and B, which are fed into a container via a mixer and then injected from the container into a mold under atmospheric pressure.

Since the viscosity properties of resin depend largely on temperature, both the container and the mold used for production of the epoxy resin composition should preferably be maintained at appropriate constant temperatures during the resin injection process. The temperature of the container for epoxy resin composition or liquids A and B should preferably be in the range of 25° C. to 90° C., while the temperature of the mold in the injection process, that is, the inlet temperature, should preferably in the range of 40° C. to 90° C.

Heat curing is carried out in the mold after completion of the resin injection. For heat curing in the mold, the temperature may be maintained for a certain period of time at the temperature of the mold at the time of injection; increased up to a point between the temperature of the mold at the time of injection and the highest curing temperature and, after being maintained there for a certain period of time, increased again up to the highest curing temperature, followed by being maintained there for a certain period of time to ensure curing; or increased up to the highest curing temperature and maintained there for a certain period of time to ensure curing. The time period for which the highest curing temperature is maintained for curing in the mold should preferably be in the range of 0.5 to 12 hours, more preferably 1 to 4 hours.

After being removed out of the mold, the material may be aftercured at temperature higher than the highest curing temperature in the mold. In this case, the curing in the mold serves as precure. Aftercure should preferably be performed for 0.5 to 12 hours, more preferably for 1 to 4 hours.

In a process for producing fiber reinforced composite materials, such as aircraft material, that require high resistance, final curing may be carried out at a temperature of 170° C. to 190° C.

The highest curing temperature is 170° C. to 190° C. in a process without an aftercure step, while if an aftercure step is included, it is performed at an aftercure temperature of 170° C. to 190° C.

If aftercure is to be performed at 170° C. to 190° C., the precure temperature, that is, the maximum temperature in the precure step, should preferably be in the range of 80° C. to 140° C.

The inclusion of a precure step at 80° C. to 140° C. serves for cost reduction because it will be possible to use low-cost mold material, tools and heat sources.

Production of the fiber reinforced composite material according to the invention may be carried out not only by the RTM method but also by any method that is designed for producing fiber reinforced composite material from a liquid epoxy resin composition, such as filament winding, pultrusion, and hand lay-up.

The fiber reinforced composite material according to the invention comprises said reinforcing fiber in combination with a cured product of said epoxy resin according to the present invention used as a matrix. In the fiber reinforced composite material according to the invention, said reinforcing fiber should preferably account for 50-85% by volume in order to achieve a high specific strength and low rigidity.

Fiber reinforced composite materials produced according to the present invention are not limited to particular applications, and can serve as material for parts of aircraft, including main wing, tail, rotor blade, fairing, cowl, and door; parts of spacecraft, including motor case and main wing; and parts of space satellite body structure. They can also be used preferably as material for automobile chassis and railroad vehicle body structure.

EXAMPLES

The present invention is described more in detail below by using examples. For the examples and comparative examples given below, the following methods were used to determine the viscosity of epoxy resin compositions; the glass transition temperature, the coefficient of linear expansion, flexural modulus, and tensile elongation of cured products; and the 0° tensile strength, 0° compressive strength, hot/wet (hereafter referred to as H/W) 0° compressive strength, and CAI of fiber reinforced composite material.

(1) Viscosity Measurement for Epoxy Resin Composition

The initial viscosity of an epoxy resin composition at 80° C., and its viscosity after being heated at 80° C. for one hour were measured as follows. An EHD-type cone-and-plate rotational viscometer supplied by Toki Sangyo Co., Ltd. was used for the measurement. A 1°34'×R24 rotor was used at a revolution speed of 10 rpm, and measurements were made for 1 cm$^3$ samples. After setting the cup temperature of the viscometer to 80° C., 1 cm$^3$ of an epoxy resin composition is injected in the cup, and changes in the viscosity were measured for one hour while keeping the cup temperature at 80° C.

(2) Measuring Method for Glass Transition Temperature of Cured Epoxy Resin

An epoxy resin composition was injected into the mold, heated in a hot air dryer from 30° C. at a heating rate of 1.5° C./min, maintained at 130° C. for two hours or at 180° C. for two hours to ensure heat curing, and then cooled down to 30° C. at a rate of 2.5° C./min to provide a cured resin plate of 2 mm in thickness.

Specimens of 12.7 mm in width and 55 mm in length were cut out of the cured resin plate produced above, and their glass transition temperature was determined by the DMA method according to SACMA SRM18R-94. In the curve of storage modulus, G', the glass transition temperature was determined from the intersection of tangent in the glass state and that in the transition state.

Here, expansion type viscoelasticity measuring equipment, ARES, supplied by Rheometric Scientific Inc. was used under the conditions of a heating rate of 5° C./min and a frequency of 1 Hz.

(3) Measuring Method for the Coefficient of Linear Expansion of Cured Product

As in the case of (2), an epoxy resin composition was cured by heating at 180° C. for two hours to produce a cured resin plate of 6 mm in thickness. Specimens of 6 mm in width and 10 mm in length were cut out of the cured resin plate produced above, and heated from 30° C. to 180° C. at a rate of 3° C./min in a TMA 2940 thermomechanical analyzer supplied by TA Instruments to determine their coefficient of linear expansion in the temperature range from 30° C. to 160° C.

(4) Measuring Method for Flexural Modulus of Cured Product

As in the case of (2), an epoxy resin composition was cured by heating at 180° C. for two hours to produce a cured resin plate of 2 mm in thickness. Specimens of 10 mm in width and 60 mm in length were cut out of the cured resin plate produced above, and a three-point bending test was carried out under the conditions of a testing speed 2.5 mm and a support span length of 32 mm to determine their flexural modulus according to JIS K7203.

(5) Measuring Method for Tensile Elongation of Cured Product

As in the case of section (4), specimens of 2 mm in thickness, 10 mm in width and 60 mm in length were cut out, and "small-1 (½)" type specimens according to JIS K7113 (in compliance with ISO 527-2) was prepared and used to determine their tensile elongation.

(6) Measuring Method for 0° Tensile Strength of Fiber Reinforced Composite Material Four 395 mm×395 mm pieces were cut out of unidirectional carbon fiber fabric (plain weave; warp: T800S-24K-10C carbon fiber supplied by Toray Industries Inc., fiber areal weight 295 g/m2, warp density 7.2/25 mm; weft: ECE225 1/0 1Z glass fiber supplied by Nitto Boseki Co., Ltd., weft density 7.5/25 mm), and placed one on top of another with their carbon fiber aligned in the 0° direction in a metal mold having a plate-shape cavity of 400 mm×400 mm×1.2 mm, and then the mold was clamped. Then, the mold was heated up to 80° C., and an epoxy resin composition heated separately elsewhere at 80° C. was injected with a resin injector into the mold under an inlet pressure of 0.2 MPa. After the completion of injection, the mold was heated up to 130° C. at a rate of 1.5° C./min, and heat curing was performed for two hours at 130° C., followed by cooing down to 30° C. and release of the product. For aftercure after release of the product, the temperature was raised from 30° C. to 180° C. at a rate of 1.5° C./min, followed by curing for two hours at 180° C. and cooling down to 30° C. to provide fiber reinforced composite material.

A piece of 229 mm in length and 12.7 mm in width was cut out of the fiber reinforced composite material with its length direction aligned in the 0° direction to produce a specimen for 0° tensile strength testing, and the 0° tensile strength of the fiber reinforced composite material was determined according to ASTM-D3039 using a universal materials testing machine (Model 4208 supplied by Instron Japan Co., Ltd.). The cross head speed during measurement was 1.27 mm/min and the measuring temperature was 23° C.

(7) Measuring Method for 0° Compressive Strength of Fiber Reinforced Composite Material A piece of 79.4 mm in length and 12.7 mm in width was cut out of fiber reinforced composite material produced by the same procedure as in (6) to produce a specimen for 0° compressive strength testing, and the 0° compressive strength of the fiber reinforced composite material was determined according to ASTM D695 using a universal materials testing machine (Model 4208 supplied by Instron Japan Co., Ltd.). The cross head speed during measurement was 1.27 mm/min and the measuring temperature was 23° C.

(8) Measuring Method for H/W 0° Compressive Strength of Fiber Reinforced Composite Material A specimen for 0° compressive strength testing produced by the same procedure as in (8) was immersed in warm water of 72° C. for 14 days, and its 0° compressive strength was measured at 82° C.

(9) Measuring Method for CAI of Fiber Reinforced Composite Material

Pieces of 395 mm×395 mm were cut out of unidirectional carbon fiber fabric (plain weave; warp: T800S-24K-10C carbon fiber supplied by Toray Industries Inc., fiber areal weight 295 g/m2, warp density 7.2/25 mm; weft: ECE225 1/0 1Z glass fiber supplied by Nitto Boseki Co., Ltd., weft density 7.5/25 mm), 12 of which were then placed one on top of another, in a metal mold having a plate-shape cavity of 400 mm×400 mm×1.2 mm, in the direction of 45°, 0°, −45° and 90° respectively (repeated three times) relative to the direction of carbon fiber, which was defined as the 0° direction, followed by another 12 pieces being placed one on top of another in the direction of 90°, −45°, 0° and 45° respectively (repeated three times), and the mold was clamped. Then, the mold was heated to 70° C., and an epoxy resin composition heated separately elsewhere at 70° C. was injected with a resin injector into the mold under an inlet pressure of 0.2 MPa to achieve impregnation of the reinforcing fiber substrate. After the completion of impregnation, the mold was heated up to 130° C. at a rate of 1.5° C./min, and maintained for two hours at 130° C., followed by cooing down to 30° C. and release of the product. For aftercure after release of the product, the temperature was raised from 30° C. to 180° C. at a rate of 1.5° C./min, followed by curing for two hours at 180° C. and cooling down to 30° C. to provide fiber reinforced composite material.

A piece of 101.6 mm in width and 152.4 mm in length was cut out of the fiber reinforced composite material produced above, to produce a specimen with its length direction aligned in the 0° direction, and CAI was determined according to the Boeing testing method BMS7260. The equipment used was a Model 1128 tensilon supplied by Instron Corporation. Here, the drop impact was 6.7 J/mm, the cross head speed during measurement 1.27 mm/min, and the measuring temperature 23° C.

[Resin Materials]

The epoxy resin, polyamine, and accelerator described below were used in examples 1-7 and comparative examples 1-3. Measured composition and other properties of the epoxy resin compositions used in examples 1-7 and comparative examples 1-3 are summarized in Table 1.

Component (1): Epoxy Resin that is Liquid at Room Temperature

"Epikote" 630 (N,N,O-triglycidyl-p-aminophenol, supplied by Japan Epoxy Resins Co., Ltd., epoxy equivalent weight 97.5).

"Araldite" MY-721 (N,N,N',N'-tetraglycidyl-4,4'-diamino-diphenylmethane, supplied by Vantico Ltd., epoxy equivalent weight 113)

"Celloxide" 2021P (3,4-epoxycyclohexylmethyl-3,4-epoxycyclohexanecarboxylate, Daicel Chemical Industries, Ltd., epoxy equivalent weight 136.5)

"Heloxy" 68 (diglycidyl ether of neopentylene glycol, supplied by Japan Epoxy Resins Co., Ltd., epoxy equivalent weight 135).

"Epikote" 807 (diglycidyl ether of bisphenol F, supplied by Japan Epoxy Resins Co., Ltd., epoxy equivalent weight 170).

"Denacol" EX721 (diglycidyl phthalate, supplied by Nagase Kasei Kogyo Co., Ltd., epoxy equivalent weight 154

Other Epoxy Resin

"AER" 4152 (epoxy resin having a oxazolidone ring produced by reacting two molecules of diglycidyl ether of bisphenol A and one molecule of tolylene diisocyanate, supplied by Asahi Kasei Epoxy Co., Ltd., epoxy equivalent weight 340)

Component (2): Aromatic Polyamine that is Liquid at Room Temperature

"Epicure" W (diethyl toluenediamine, supplied by Japan Epoxy Resins Co., Ltd. active hydrogen equivalent weight 45)

Component (3): Diaminodiphenyl Sulfone 3,3'-DAS (3,3'-diaminodiphenyl sulfone, supplied by Mitsui Kagaku Fine Chemicals Inc., active hydrogen equivalent weight 62)

"Sumicure" S (4,4'-diaminodiphenylsulfone, Sumitomo Chemical Co., Ltd., active hydrogen equivalent weight 62)

Accelerator

PTSP (propyl-p-toluenesulfonate, supplied by Wako Pure Chemical Industries, Ltd.)

TBC (4-tert-butylcatechol, supplied by Ube Industries Co., Ltd.)

$BF_3$.piperidine complex (supplied by Stella Chemifa Corporation)

"Cuazorl" 2E4MZ (2-ethyl-4-methylimidazole, supplied by Shikoku Corporation)

Example 1

One hundred (100) parts of "Epikote" 630, selected as component (1), is used as Liquid (A1). Seventy (70) parts of "Epicure" W, selected as component (2), and 30 parts of 3,3'-DAS, selected as component (3), are mixed and stirred for one hour at 100° C. until 3,3'-DAS is dissolved homogeneously to provide liquid (B1). No precipitation took place in Liquid (B1) when stored at 5° C. for 30 days. One hundred (100) parts of liquid (A1) and 50.3 parts of liquid (B1) were mixed to produce an epoxy resin composition, followed by measurement of its initial viscosity at 80° C. and viscosity after storage for one hour, which were found to be 28 cP and 39 cP, respectively, showing that its viscosity was sufficiently low. Then, cured resin plates were produced by the method described above and their properties were measured, with results indicating that their glass transition temperature after curing at 130° C. for two hours and curing at 180° C. for two hours was 109° C. and 225° C., respectively, and that their coefficient of linear expansion was $6.7 \times 10^{-5} K^{-1}$.

Further, this epoxy resin composition was used to produce fiber reinforced composite material, followed by measurement of its 0° tensile strength, which was found to be 2650 MPa, showing that its strength was sufficiently high.

Example 2

Liquid (A1) was prepared by the same procedure as in example 2. Seventy (70) parts of "Epicure" W, selected as component (2), 15 parts of 3,3'-DAS, selected as component (3), and 15 parts of "Sumicure" S were mixed and stirred for one hour at 100° C. until 3,3'-DAS and "Sumicure" S were dissolved homogeneously to provide liquid (B1). No precipitation took place in Liquid (B1) when stored at 5° C. for 30 days.

One hundred (100) parts of liquid (A1) and 50.3 parts of liquid (B1) were mixed to produce an epoxy resin composition, followed by measurement of its initial viscosity at 80° C. and viscosity after storage for one hour, which were found to be 28 cP and 39 cP, respectively, showing that its viscosity was sufficiently low. Then, cured resin plates were produced by the method described above and their properties were measured, with results indicating that their glass transition temperature after curing at 130° C. for two hours and curing at 180° C. for two hours was 109° C. and 225° C., respectively, and that their coefficient of linear expansion was $6.7 \times 10^{-5} K^{-1}$.

Example 3

Liquid (A1) was prepared by the same procedure as in example 1. Further, 2 parts of PTSP, used as accelerator, was added to liquid (B1) prepared in example 2 to provide a new liquid (B1)

One hundred (100) parts of liquid (A1) and 51.3 parts of liquid (B1) were mixed to produce an epoxy resin composition, followed by measurement of its initial viscosity at 80° C. and viscosity after storage at 80° C. for one hour, which were found to be 24 cP and 79 cP, respectively, showing that its viscosity was sufficiently low. Then, cured resin plates were produced by the method described above and their properties were measured, with results indicating that their glass transition temperature after curing at 130° C. for two hours and curing at 180° C. for two hours was 128° C. and 227° C., respectively. The glass transition temperature after curing at 130° C. for two hours was higher than in example 2 (109° C.), showing that the low temperature hardenability was improved by adding the accelerator. The coefficient of linear expansion was $6.7 \times 10^{-5} K^{-1}$.

Example 4

Liquid (A1) and liquid (B1) were prepared by the same procedure as in example 3 except that two parts of TBC was added as accelerator instead of PTSP which was used in example 3.

One hundred (100) parts of liquid (A1) and 51.3 parts of liquid (B1) were mixed to produce an epoxy resin composition, followed by measurement of its initial viscosity at 80° C. and viscosity after storage at 80° C. for one hour, which were found to be 32 cP and 115 cP, respectively, showing that its viscosity was sufficiently low. Then, cured resin plates were produced by the method described above and their properties were measured, with results indicating that their glass transition temperature after curing at 130° C. for two hours and curing at 180° C. for two hours was 121° C. and 227° C., respectively. The glass transition temperature after curing at 130° C. for two hours was higher than in example 2 (109° C.), showing that the low temperature hardenability was improved by adding the accelerator. The coefficient of linear expansion was $6.7 \times 10^{-5} K^{-1}$.

Example 5

Liquid (A1) was prepared by the same procedure as in example 1. Seventy (60) parts of "Epicure" W, selected as component (2), and 40 parts of 3,3'-DAS, selected as component (3), were mixed and stirred for one hour at 100° C. until 3,3'-DAS is dissolved homogeneously to provide liquid (B1). No precipitation took place in Liquid (B1) when stored at 5° C. for 30 days.

One hundred (100) parts of liquid (A1) and 51.8 parts of liquid (B1) were mixed to produce an epoxy resin composition, followed by measurement of its initial viscosity at 80° C., which was found to be 38 cP, showing that its viscosity was sufficiently low.

Then, cured resin plates were produced by the method described above and their properties were measured, with results indicating that their glass transition temperature after curing at 130° C. for two hours and curing at 180° C. for two hours was 108° C. and 234° C., respectively, and that their coefficient of linear expansion was $6.7 \times 10^{-5} K^{-1}$.

Example 6

Forty (40) parts of "Celloxide" 2021P, selected as component (1), 10 parts of "Heloxy" 68, selected as another component (1), and 30 parts "AER" 4152, selected as "other epoxy resins," were mixed and stirred for one hour at 120° C., and after cooling down to 70° C., 20 parts of "Araldite" MY-721, selected as still another component (1), was added, followed by stirring for mixing for 30 minutes at 70° C. to provide liquid (A1). Then, 77 parts of "Epicure" W, selected as component (2), and 23 parts of 3,3'-DAS, selected as component (3), were mixed and stirred for one hour at 100° C. to achieve homogeneous dissolution, and after cooling down to 60° C., 17 parts of $BF_3$.piperidine complex was added as accelerator. Stirring was performed for further 30 minutes at 60° C. to achieve homogeneous dissolution of 3,3'-DAS, and the resulting mixture was used as liquid (B1). No precipitation took place in Liquid (B1) when stored at 5° C. for 30 days.

One hundred (100) parts of liquid (A1) and 32.7 parts of liquid (B1) were mixed to produce an epoxy resin composition, followed by measurement of its initial viscosity at 80° C., which was found to be 71 cP, showing that its viscosity was sufficiently low.

Then, cured resin plates were produced by the method described above and their properties were measured, with results indicating that their glass transition temperature after curing at 130° C. for two hours and curing at 180° C. for two hours was 125° C. and 172° C., respectively, and that their coefficient of linear expansion was $6.5 \times 10^{-5} K^{-1}$.

Further, this epoxy resin composition was used to produce fiber reinforced composite material, followed by measurement of its 0° tensile strength, which was found to be 2840 MPa, showing that its strength was sufficiently high.

Example 7

Twenty (20) parts of "Epikote" 807, 50 parts of "Araldite" MY-721, and 30 parts of "Denacol" EX721, all selected as component (1), were mixed and stirred for one hour at 60° C. to provide liquid (A1) Then, 55.6 parts of "Epicure" W, selected as component (2), 22.2 parts of 3,3'-DAS, 22.2 parts of "Sumicure" S, both selected as component (3), and 3 parts of Cuazorl 2E4MZ, selected as accelerator, were mixed and stirred for one hour at 100° C. for homogeneous dissolution to provide liquid (B1). No precipitation took place in Liquid (B1) when stored at 5° C. for 30 days.

One hundred (100) parts of liquid (A1) and 33.4 parts of liquid (B1) were mixed to produce an epoxy resin composition, followed by measurement of its initial viscosity at 80° C., which was found to be 39 cP, showing that its viscosity was sufficiently low.

Then, cured resin plates were produced by the method described above and their properties were measured, with results indicating that their glass transition temperature after curing at 130° C. for two hours and curing at 180° C. for two hours was 121° C. and 176° C., respectively, and that their coefficient of linear expansion was $6.3 \times 10^{-5} K^{-1}$.

Further, this epoxy resin composition was used to produce fiber reinforced composite material, followed by measurement of its 0° tensile strength, which was found to be 2860 MPa, showing that its strength was sufficiently high.

Comparative Example 1

One hundred (100) parts of "Epikote" 630, selected as component (1) and 100 parts of "Epicure" W, selected as component (2) were used as liquid (A1) and liquid (B1), respectively.

One hundred (100) parts of liquid (A1) and 46 parts of liquid (B1) were mixed to produce an epoxy resin composition, followed by measurement of its viscosity at 80° C., which was found to be 15 cP, showing that its viscosity was sufficiently low.

Then, cured resin plates were produced by the method described above and their properties were measured, with results indicating that their glass transition temperature after curing at 180° C. for two hours was 233° C. and that their coefficient of linear expansion was $7.5 \times 10^{-5} K^{-1}$, showing that the coefficient of linear expansion observed in this comparative example which used a smaller amount of component (3) than required for the present invention was higher than in example 1.

Further, this epoxy resin composition was used to produce fiber reinforced composite material, followed by measurement of its 0° tensile strength, which was found to be 2380 MPa, showing that its strength was lower than in example 1.

Comparative Example 2

Liquid (A1) was prepared by the same procedure as in example 1. Then, 77 parts of "Epicure" W, selected as component (2), and 23 parts of "Sumicure" S, selected as component (3), were mixed and stirred for one hour at 100° C. to achieve homogeneous dissolution, and after cooling down to 70° C., 17 parts of BF₃.piperidine complex was added, followed by further stirring for 30 minutes at 70° C. for homogeneous dissolution to provide liquid (B1). Said liquid (B1) contained a smaller amount of component (2) than required for the present invention, and accordingly precipitation of crystals was seen when the liquid was stored for 30 days at 5° C.

One hundred (100) parts of liquid (A1) and 32.7 parts of liquid (B1) were mixed to produce an epoxy resin composition, followed by measurement of its initial viscosity at 80° C., which was found to be 830 cP, showing that its viscosity was higher than in examples. Then, cured resin plates were produced by the method described above and their properties were measured, with results indicating that their glass transition temperature after curing at 130° C. for two hours and curing at 180° C. for two hours was 123° C. and 172° C., respectively, and that their coefficient of linear expansion was $6.2 \times 10^{-5} K^{-1}$.

Further, this epoxy resin composition was used to produce fiber reinforced composite material, but the resulting fiber reinforced composite material was so high in the viscosity at 80° C. that it contained unpregnated portions.

Comparative Example 3

Liquid (A1) was prepared by the same procedure as in example 1. The, 91 parts of "Epicure" W, selected as component (2), 4.5 parts of 3,3'-DAS, 4.5 parts of "Sumicure" S, both selected as component (3), and 3 parts of Cuazorl 2E4MZ, selected as accelerator, were mixed and stirred for one hour at 100° C. for homogeneous dissolution of 3,3'-DAS and "Sumicure" S to provide liquid (B1). No precipitation took place in liquid (B1) when stored at 5° C. for 30 days.

One hundred (100) parts of liquid (A1) and 30 parts of liquid (B1) were mixed to produce an epoxy resin composition, and cured resin plates were produced by the method described above and examined to determine their properties, with results indicating that their glass transition temperature after curing at 130° C. for two hours and after curing at 180° C. for two hours was 125° C. and 180° C., respectively, and that their coefficient of linear expansion was $7.3 \times 10^{-5} K^{-1}$, showing that the coefficient of linear expansion observed in this comparative example which used a larger amount of component (2) than required for the present invention was higher than that seen in example 7.

Further, this epoxy resin composition was used to produce fiber reinforced composite material, followed by measurement of its 0° tensile strength, which was found to be 2520 MPa, showing that its strength was lower than that seen in example 1.

TABLE 1

| | | | | Example | | | | | | | Comparative example | | |
|---|---|---|---|---|---|---|---|---|---|---|---|---|---|
| | | | | 1 | 2 | 3 | 4 | 5 | 6 | 7 | 1 | 2 | 3 |
| Epoxy resin composition | Epoxy resin | Component (1) | "Epikote" 630 | 100 | 100 | 100 | 100 | 100 | | | 100 | 100 | 100 |
| | | | "Araldite" MY-721 | | | | | | 20 | 50 | | | |
| | | | "Celloxide" 2021P | | | | | | 40 | | | | |
| | | | "Heloxy" 68 | | | | | | 10 | | | | |
| | | | "Epikote" 807 | | | | | | | 20 | | | |
| | | | "Denacol" EX721 | | | | | | | 30 | | | |
| | | Others | "AER"4152 | | | | | | 30 | | | | |
| | Hardener | Component (2) | "Epicure" W | 70 | 70 | 70 | 70 | 60 | 60 | 55.6 | 100 | 15 | 91.0 |
| | | Component (3) | 3,3'-DAS | 30 | 15 | 30 | 15 | 40 | 40 | 22.2 | | | 4.5 |
| | | | "Sumicure" S | | 15 | | 15 | | | 22.2 | | 85 | 4.5 |
| | | Accelerator | PTSP | | | | 2.0 | | | | | | |
| | | | TBC | | | | | 2.0 | | | | | |
| | | | "Cuazorl" 2E4MZ | | | | | | | 3 | | | 3 |
| | | | BF₃ piperidine complex | | | | | | | 4.7 | | 17 | |

TABLE 1-continued

|  |  | Example 1 | Example 2 | Example 3 | Example 4 | Example 5 | Example 6 | Example 7 | Comparative example 1 | Comparative example 2 | Comparative example 3 |
|---|---|---|---|---|---|---|---|---|---|---|---|
| Mixing ratio | Epoxy resin | 100 | 100 | 100 | 100 | 100 | 100 | 100 | 100 | 100 | 100 |
|  | Hardener | 50.3 | 50.3 | 51.3 | 51.3 | 51.8 | 36.7 | 38.7 | 46.2 | 64.9 | 47.3 |
|  | Condition (I) | 100 | 100 | 100 | 100 | 100 | 70 | 100 | 100 | 100 | 100 |
|  | Condition (II) | 100 | 100 | 100 | 100 | 100 | 100 | 100 | 100 | 100 | 100 |
|  | Condition (III) | 30 | 30 | 30 | 30 | 40 | 40 | 44.4 | 0 | 85 | 9 |
|  | Condition (IV) | 1.0 | 1.0 | 1.0 | 1.0 | 1.0 | 1.0 | 1.0 | 1.0 | 1.0 | 1.0 |
|  | Precipitation of hardener at 5° C. | none | none | none | none | none | none | none | none | yes | none |
|  | Weight ratio of component (3) to component (2) | 0.42 | 0.42 | 0.42 | 0.42 | 0.67 | 0.67 | 0.80 | 0.00 | 5.67 | 0.10 |
| Cured product | Coefficient of linear expansion ($\times 10^5$) ($K^{-1}$) | 6.7 | 6.7 | 6.7 | 6.7 | 6.7 | 6.5 | 6.3 | 7.5 | 6.2 | 7.3 |
|  | Glass transition temperature (° C.) 130° C. × 2 hrs | 109 | 109 | 128 | 121 | 108 | 125 | 121 | 113 | 123 | 125 |
|  | 180° C. × 2 hrs | 225 | 225 | 227 | 227 | 234 | 172 | 176 | 233 | 172 | 180 |
|  | Viscosity at 80° C. (mPa · s) Initial | 28 | 28 | 24 | 32 | 38 | 71 | 39 | 15 | 830 | 21 |
|  | After 1 hr | 39 | 39 | 79 | 115 | — | — | — | — | — | — |
|  | 1 hr/Initial | 1.4 | 1.4 | 3.3 | 3.6 | — | — | — | — | — | — |
| Fiber reinforced composite material | Content by volume of reinforcing fiber (%) | 55 |  |  |  |  | 55 | 55 | 55 |  | 55 |
|  | 0° tensile strength (MPa) | 2650 | — | — | — | — | 2840 | 2860 | 2380 | — | 2520 |

[Resin Materials]

The following epoxy resins, polyamines, and accelerators were used in examples 8-12 and comparative examples 4-5. Measured compositions and properties of the epoxy resin compositions used in examples 8-12 and comparative examples 4-5 are shown in Table 2.

Component (4): Epoxy Resins with Tri- or Higher Functionality
 "Epikote" 630 (N,N,O-triglycidyl-p-aminophenol, supplied by Japan Epoxy Resins Co., Ltd., epoxy equivalent weight 97.5).
 "Araldite" MY-721 (N,N,N',N'-tetraglycidyl-4,4'-diamino-diphenylmethane, supplied by Vantico Ltd., epoxy equivalent weight 113).

Component (5): Aromatic Epoxy Resin with Di-Functionality
 "Epikote" 825 (diglycidyl ether of bisphenol A, supplied by Japan Epoxy Resins Co., Ltd., epoxy equivalent weight 175).
 "Epiclon" HP-7200L (polyglycidyl ether in the form of a condensation product of phenol and dicycolpentadiene, supplied by Dainippon Ink And Chemicals, Incorporated, epoxy equivalent weight 246)
 "Epiclon" HP-4032 (diglycidyl ether of 1,6-dihydroxynaphthalene, supplied by Dainippon Ink And Chemicals, Incorporated, epoxy equivalent weight 180)

Other Epoxy Resin
 AK-601 (diglycidyl hexahydrophthalate, supplied by Nippon Kayaku Ltd., epoxy equivalent weight 154)

Component (6): Aromatic Polyamine
 "Epicure" W (diethyl toluenediamine, supplied by Japan Epoxy Resins Co., Ltd., active hydrogen equivalent weight 45)
 3,3'-DAS (3,3'-diaminodiphenyl sulfone, supplied by Mitsui Kagaku Fine Chemicals Inc., active hydrogen equivalent weight 62)
 "Sumicure" S (4,4'-diaminodiphenyl sulfone, supplied by Sumitomo Chemical Ltd., active hydrogen equivalent weight 62)

Accelerator
 PTSP (n-propyl ester of p-toluenesulfonic acid, supplied by Wako Pure Chemical Industries, Ltd.)
 TBC (tert-butyl catechol, supplied by Ube Industries Ltd.).

Example 8

Thirty (30) parts of "Araldite" MY-721, selected as component (4), 50 parts of "Epikote" 825, selected as component (5), and 20 parts of AK-601, selected as "other epoxy resin", were mixed and stirred for one hour at 70° C. to provide liquid (A2).

Then, 55.6 parts of "Epicure" W, 22.2 parts of 3,3'-DAS, and 22.2 parts of "Sumicure" S, all selected as component (6), were mixed and stirred for one hour at 100° C., and after cooling down to 70° C., 2 parts of PTSP, selected as accelerator, was added, followed by further stirring for 30 minutes at 70° C. for homogeneous dissolution of 3,3'-DAS and "Sumicure" S to provide liquid (B2).

One hundred (100) parts of liquid (A2) and 36.3 parts of liquid (B2) were mixed to produce an epoxy resin composition, followed by measurement of its initial viscosity at 80° C. and viscosity after storage for one hour at 80° C., which were found to be 271 cP and 894 cP, respectively.

Then, cured resin plates were produced by the method described above and their properties were measured, with results indicating that their glass transition temperature after curing at 180° C. for two hours was 180° C. while their flexural modulus and tensile elongation were 3.3 GPa and 4.3%, respectively, showing that they had sufficiently high heat resistance and good mechanical properties. Further, this epoxy resin composition was used to produce fiber reinforced composite material, followed by measurement of its 0° tensile strength, which was found to be 2730 MPa, showing that its strength was sufficiently high.

Example 9

Thirty (30) parts of "Epikote" 630, selected as component (4), 50 parts of Epiclon HP-7200L, selected as component (5), and 20 parts of AK-601, selected as "other epoxy resin", were mixed and stirred for one hour at 70° C. to provide liquid (A2). Liquid (B2) used in example 8 was used as component (6).

One hundred (100) parts of liquid (A2) and 34.2 parts of liquid (B2) were mixed to produce an epoxy resin composition, followed by measurement of its initial viscosity at 80° C. and viscosity after storage for one hour at 80° C., which were found to be 95 cP and 238 cP, respectively.

Then, cured resin plates were produced by the method described above and their properties were measured, with results indicating that their glass transition temperature after curing at 180° C. for two hours was 178° C. while their flexural modulus and tensile elongation were 3.3 GPa and 5.1%, respectively, showing that they had sufficiently high heat resistance and good mechanical properties. Further, this epoxy resin composition was used to produce fiber reinforced composite material, followed by measurement of its 0° tensile strength, which was found to be 2670 MPa, showing that its strength was sufficiently high.

Example 10

Then, 20 parts of "Epikote" 825, 30 parts of Epiclon HP-4032, both selected as component (5), and 20 parts of AK-601, selected as "other epoxy resin", were mixed and stirred for one hour at 120° C., and after cooling down to 70° C., 30 parts of "Epikote" 630, selected as component (4), was added, followed by further stirring for one hour at 70° C. to provide liquid (A2).

Liquid (B2) used in example 8 was used as component (6).

One hundred (100) parts of liquid (A2) and 38.2 parts of liquid (B2) were mixed to produce an epoxy resin composition, followed by measurement of its initial viscosity at 80° C. and viscosity after storage for one hour at 80° C., which were found to be 38 cP and 95 cP, respectively.

Then, cured resin plates were produced by the method described above and their properties were measured, with results indicating that their glass transition temperature after curing at 180° C. for two hours was 181° C. while their flexural modulus and tensile elongation were 3.3 GPa and 4.8%, respectively, showing that they had sufficiently high heat resistance and good mechanical properties. Further, this epoxy resin composition was used to produce fiber reinforced composite material, followed by measurement of its 0° tensile strength, which was found to be 2670 MPa, showing that its strength was sufficiently high.

Example 11

Then, 20 parts of "Epikote" 825, 30 parts of Epiclon HP-4032, both selected as component (5), and 20 parts of AK-601, selected as "other epoxy resin", were mixed and stirred for one hour at 120° C., and after cooling down to 70° C., 30 parts of "Epikote" 630, selected as component (4), was added, followed by further stirring for one hour to provide liquid (A2).

Then, 55.6 parts of "Epicure" W, 22.2 parts of 3,3'-DAS, and 22.3 parts of "Sumicure" S, all selected as component (6), were mixed and stirred for one hour at 100° C., and after cooling down to 70° C., 2 parts of TBC, selected as accelerator, was added, followed by further stirring for 30 minutes at 70° C. for homogeneous dissolution to provide liquid (B2).

One hundred (100) parts of liquid (A2) and 35.5 parts of liquid (B2) were mixed to produce an epoxy resin composition, followed by measurement of its initial viscosity at 80° C. and viscosity after storage for one hour at 80° C., which were found to be 70 cP and 189 cP, respectively.

Then, cured resin plates were produced by the method described above and their properties were measured, with results indicating that their glass transition temperature after curing at 180° C. for two hours was 182° C. while their flexural modulus and tensile elongation were 3.3 GPa and 4.8%, respectively, showing that they had sufficiently high heat resistance and good mechanical properties. Further, this epoxy resin composition was used to produce fiber reinforced composite material, followed by measurement of its 0° tensile strength, which was found to be 2760 MPa, showing that its strength was sufficiently high.

Example 12

Here, 20 parts of "Epikote" 825, 30 parts of Epiclon HP-7200, both selected as component (5), and 20 parts of AK-601, selected as "other epoxy resin", were mixed and stirred for one hour at 120° C., and after cooling down to 70° C., 30 parts of "Araldite" MY-721, selected as component (4), was added, followed by further stirring for one hour to provide liquid (A2).

The same hardener as in example 1 was used as liquid (B2). One hundred (100) parts of liquid (A2) and 33.8 parts of liquid (B2) were mixed to produce an epoxy resin composition, followed by measurement of its initial viscosity at 80° C. and viscosity after storage for one hour at 80° C., which were found to be 137 cP and 345 cP, respectively.

Then, cured resin plates were produced by the method described above and their properties were measured, with results indicating that their glass transition temperature after curing at 180° C. for two hours was 179° C. while their flexural modulus and tensile elongation were 3.3 GPa and 5.2%, respectively, showing that they had sufficiently high heat resistance and good mechanical properties. Further, this epoxy resin composition was used to produce fiber reinforced composite material, followed by measurement of its 0° tensile strength, which was found to be 2740 MPa, showing that its strength was sufficiently high.

Comparative Example 4

Eighty (80) parts of Epikote 630, selected as component (4), and 20 parts of "Epikote" 825, selected as component (5), were mixed and stirred for one hour at 70° C. to provide liquid (A2). The same hardener as in example 1 was used as liquid (B2).

One hundred (100) parts of liquid (A2) and 49.3 parts of liquid (B2) were mixed to produce an epoxy resin composition, followed by measurement of its initial viscosity at 80° C. and viscosity after storage for one hour at 80° C., which were found to be 54 cP and 189 cP, respectively.

Then, cured resin plates were produced by the method described above and their properties were measured, with results indicating that their glass transition temperature after curing at 180° C. for two hours was 195° C. while their flexural modulus and tensile elongation were 3.5 GPa and 3.2%, respectively, showing that though the epoxy resin composition of this comparative example had a high heat resistance, it was smaller in the theory molecular weight between crosslinking points than required for the present invention, leading to poor tensile elongation.

Further, this epoxy resin composition was used to produce fiber reinforced composite material, followed by measurement of its 0° tensile strength, which was found to be 2370

MPa, showing that its strength was lower than required for good reinforced composite material.

Comparative Example 5

Ten (10) parts of "Epikote" 630, selected as component (4), 70 parts of "Epikote" 825, selected as component (5), and 20 parts of AK-601, selected as "other epoxy resin", were mixed and stirred for one hour at 70° C. to provide liquid (A2).

The same hardener as in example 8 was used as liquid (B2). One hundred (100) parts of liquid (A2) and 33.8 parts of liquid (B2) were mixed to produce an epoxy resin composition, followed by measurement of its initial viscosity at 80° C. and viscosity after storage for one hour at 80° C., which were found to be 85 cP and 310 cP, respectively.

Then, cured resin plates were produced by the method described above and their properties were measured, with results indicating that their glass transition temperature after curing at 180° C. for two hours was 165° C. while their flexural modulus and tensile elongation were 3.1 GPa and 5.9%, respectively, showing that though the epoxy resin composition of this comparative example had a high heat resistance, it was smaller in the theory molecular weight between crosslinking points than required for the present invention, leading to poor heat resistance.

Further, this epoxy resin composition was used to produce fiber reinforced composite material, followed by measurement of its 0° tensile strength, which was found to be 2830 MPa, showing that its strength was high.

[Resin Materials]

The following epoxy resins, polyamines, and accelerators were used in examples 13-14 and comparative examples 6-7. Measured compositions and properties of the epoxy resin compositions used in examples 13-14 and comparative examples 6-7 are summarized in Table 3.

Component (7): Polyglycidyl Ether of Phenol Aralkyl Resin
  NC-3000 (phenol-aralkyl type epoxy resin, supplied by Nippon Kayaku Co., Ltd., epoxy equivalent weight 275)

Other Epoxy Resin
  "Epikote" 825 (diglycidyl ether of bisphenol A, liquid, at room temperature, supplied by Japan Epoxy Resins Co., Ltd., epoxy equivalent weight 175).
  AK-601 (diglycidyl hexahydrophthalate, supplied by Nippon Kayaku Co., Ltd., epoxy equivalent weight 154)
  "Epikote" 834 (bisphenol A type epoxy resin, solid at room temperature, supplied by Japan Epoxy Resins Co., Ltd., epoxy equivalent weight 250)

Component (8): Polyamine
  "Epicure" W (diethyl toluenediamine, supplied by Japan Epoxy Resins Co., Ltd., active hydrogen equivalent weight 45)
  3,3'-DAS (3,3'-diaminodiphenyl sulfone, supplied by Mitsui Kagaku Fine Chemicals Inc., active hydrogen equivalent weight 62).
  "Sumicure" (4,4'-diaminodiphenyl sulfone, supplied by Sumitomo Chemical Ltd., active hydrogen equivalent weight 62)

TABLE 2

| | | | | Example | | | | | Comparative example | |
|---|---|---|---|---|---|---|---|---|---|---|
| | | | | 8 | 9 | 10 | 11 | 12 | 4 | 5 |
| Epoxy resin composition | Epoxy resin | Component (4) | "Araldite" MY-721 | 30 | | | | 30 | | |
| | | | "Epikote" 630 | | 30 | 30 | 30 | | 80 | 10 |
| | | Component (5) | "Epikote" 825 | 50 | | 20 | 20 | 20 | 20 | 70 |
| | | | "Epiclon" HP-7200L | | 50 | | 30 | 30 | | |
| | | | "Epiclon" HP-4032 | | | 30 | | | | |
| | | Others | AK-601 | 20 | 20 | 20 | 20 | 20 | | 20 |
| | Hardener | Component (6) | "Epicure" W | 55.6 | 55.6 | 55.6 | 55.6 | 55.6 | 55.6 | 55.6 |
| | | | 3,3'-DAS | 22.2 | 22.2 | 22.2 | 22.2 | 22.2 | 22.2 | 22.2 |
| | | | "Sumicure" S | 22.2 | 22.2 | 22.2 | 22.2 | 22.2 | 22.2 | 22.2 |
| | | Accelerator | PTSP | 1.4 | 1.4 | 1.4 | | 1.4 | 1.4 | 1.4 |
| | | | TBC | | | | 1.0 | | | |
| | Mixing ratio | Epoxy resin | | 100 | 100 | 100 | 100 | 100 | 100 | 100 |
| | | Hardener | | 36.3 | 34.2 | 38.2 | 35.5 | 33.8 | 49.3 | 33.8 |
| | Viscosity at 80° C. | Initial (mPa · s) | | 271 | 95 | 38 | 70 | 137 | 54 | 185 |
| | | After 1 hr (mPa · s) | | 894 | 313 | 125 | 231 | 452 | 189 | 629 |
| | | 1 hr/Initial | | 3.3 | 3.3 | 3.3 | 3.3 | 3.3 | 3.5 | 3.4 |
| Cured product | Theoretical molecular weight between crosslinking points (g/mol) | | | 285 | 314 | 296 | 306 | 295 | 200 | 378 |
| | Flexural modulus (GPa) | | | 3.3 | 3.3 | 3.3 | 3.3 | 3.3 | 3.4 | 3.1 |
| | Glass transition temperature (° C.) | 130° C. × 2 hrs | | 131 | 125 | 123 | 128 | 128 | 145 | 109 |
| | | 180° C. × 2 hrs | | 180 | 178 | 181 | 182 | 179 | 195 | 165 |
| | Tensile elongation (%) | | | 4.3 | 5.0 | 4.8 | 4.8 | 5.2 | 3.2 | 5.9 |
| Fiber reinforced composite material | Content by volume of reinforcing fiber (%) | | | 55 | 55 | 55 | 55 | 55 | 55 | 55 |
| | 0° tensile strength (MPa) | | | 2730 | 2670 | 2670 | 2760 | 2740 | 2370 | 2830 |

Accelerator

TBC (4-tert-butylcatechol, supplied by Ube Industries Ltd.)

Example 13

Here, 30 parts of NC-3000, selected as component (7), 20 parts of "Epikote" 825, and 20 parts of AK-601, both selected as "other epoxy resin", were mixed and stirred for one hour at 120° C., and after cooling down to 70° C., 30 parts of "Epikote" 630, selected as "other epoxy resin", was added, followed by further stirring for one hour at 70° C. to provide epoxy resin.

Then, 55.6 parts of "Epicure" W, 22.2 parts of 3,3'-DAS, and 22.2 parts of "Sumicure" S, all selected as component (8), were mixed and stirred for one hour at 100° C., and after cooling down to 70° C., 2 parts of TBC, selected as accelerator, was added, followed by further stirring for 30 minutes at 70° C. for homogeneous dissolution of 3,3'-DAS and "Sumicure" S to provide a hardener.

One hundred (100) parts of said epoxy resin and 33.8 parts of said hardener were mixed to produce an epoxy resin composition, followed by measurement of its initial viscosity at 80° C., which was found to be 88 cP, showing that its viscosity was sufficiently low.

Then, cured resin plates were produced by the method described above and their properties were measured, with results indicating that their glass transition temperature after curing at 180° C. for two hours was 178° C. while their flexural modulus and tensile elongation were 3.2 GPa and 6.2%, respectively, showing that they had sufficiently high heat resistance and good mechanical properties. The theoretical molecular weight between crosslinking points of the cured product was 309 g/mol.

Further, this epoxy resin composition was used to produce fiber reinforced composite material, followed by measurement of its 0° tensile strength, 0° compressive strength, and CAI, which were found to be 2870 MPa, 1390 MPa and 234 MPa, respectively, showing that it had sufficiently good mechanical properties.

Example 14

Here, 25 parts of NC-3000, selected as component (7), 10 parts of Epikote 825, and 30 parts of AK-601, both selected as "other epoxy resin", were mixed and stirred for one hour at 120° C., and after cooling down to 70° C., 35 parts of "Epikote" 630, selected as "other epoxy resin", was added, followed by further stirring for one hour at 70° C. to provide epoxy resin. The same hardener as in example 13 was used here.

One hundred (100) parts of said epoxy resin and 33.8 parts of said hardener were mixed to produce an epoxy resin composition, followed by measurement of its initial viscosity at 80° C., which was found to be 68 cP, showing that its viscosity was sufficiently low.

Then, cured resin plates were produced by the method described above and their properties were measured, with results indicating that their glass transition temperature after curing at 180° C. for two hours was 180° C. while their flexural modulus and tensile elongation were 3.4 GPa and 5.4%, respectively, showing that they had sufficiently high heat resistance and good mechanical properties. The theoretical molecular weight between crosslinking points of the cured product was 289 g/mol.

Further, this epoxy resin composition was used to produce fiber reinforced composite material, followed by measurement of its 0° tensile strength, 0° compressive strength, and CAI, which were found to be 2860 MPa, 1420 MPa and 241 MPa, respectively, showing that it had sufficiently good mechanical properties.

Comparative Example 6

Here, 50 parts of "Epikote" 630, 30 parts of "Epikote" 825, and 20 parts of AK-601 were mixed and stirred for one hour at 70° C. to provide epoxy resin. The same hardener as in example 13 was used here.

One hundred (100) parts of said epoxy resin and 41.7 parts of said hardener were mixed to produce an epoxy resin composition, followed by measurement of its initial viscosity at 80° C., which was found to be 30 cP, showing that its viscosity was sufficiently low.

Then, cured resin plates were produced by the method described above and their properties were measured, with results indicating that their glass transition temperature after curing at 180° C. for two hours was 192° C. while their flexural modulus and tensile elongation were 3.4 GPa and 3.5%, respectively, showing that they were inferior in tensile elongation. The theoretical molecular weight between crosslinking points of the cured product was 245 g/mol.

Further, this epoxy resin composition was used to produce fiber reinforced composite material, followed by measurement of its 0° tensile strength, 0° compressive strength, and CAI, which were found to be 2500 MPa, 1380 MPa and 200 MPa, respectively, showing that though it had high 0° tensile strength, it was poor in 0° compressive strength and CAI.

Comparative Example 7

Epoxy resin used here was the same as in example 13 except that NC-3000 used in example 13 was replaced with "Epikote" 834 in about the same amount in terms of epoxy equivalent weight. The same hardener as in example 13 was used here.

One hundred (100) parts of said epoxy resin and 34.4 parts of said hardener were mixed to produce an epoxy resin composition, followed by measurement of its initial viscosity at 80° C., which was found to be 60 cP, showing that its viscosity was sufficiently low.

Then, cured resin plates were produced by the method described above and their properties were measured, with results indicating that their glass transition temperature after curing at 180° C. for two hours was 169° C. while their flexural modulus and tensile elongation were 3.3 GPa and 5.6%, respectively, showing that their glass transition temperature was unfavorably low. The theoretical molecular weight between crosslinking points of the cured product was 307 g/mol.

Further, this epoxy resin composition was used to produce fiber reinforced composite material, followed by measurement of its 0° tensile strength, 0° compressive strength, and CAI, which were found to be 2870 MPa, 1410 MPa and 236 MPa, respectively, showing that it had sufficiently good mechanical properties.

TABLE 3

| | | | | Example | | Comparative example | |
|---|---|---|---|---|---|---|---|
| | | | | 13 | 14 | 6 | 7 |
| Epoxy resin composition | Epoxy resin | Component (7) | NC-3000 | 30 | 25 | | |
| | | Others | "Epikote" 630 | 30 | 35 | 50 | 30 |
| | | | "Epikote" 825 | 20 | 10 | 30 | 20 |
| | | | AK-601 | 20 | 30 | 20 | 20 |
| | | | "Epikote" 834 | | | | 30 |
| | Hardener | Component (8) | "Epicure" W | 55.6 | 55.6 | 55.6 | 55.6 |
| | | | 3,3'-DAS | 22.2 | 22.2 | 22.2 | 22.2 |
| | | | "Sumicure" S | 22.2 | 22.2 | 22.2 | 22.2 |
| | | Accelerator | TBC | 1.0 | 1.0 | 1.0 | 1.0 |
| | Mixing ratio | Epoxy resin | | 100 | 100 | 100 | 100 |
| | | Hardener | | 34.9 | 37.0 | 41.7 | 34.4 |
| | Initial viscosity at 80° C. (mPa · s) | | | 88 | 68 | 30 | 60 |
| Cured product | Theoretical molecular weight between crosslinking points (g/mol) | | | 309 | 289 | 245 | 307 |
| | Flexural modulus (GPa) | | | 3.2 | 3.4 | 3.4 | 3.3 |
| | Glass transition temperature (° C.) | | 180° C. × 2 hrs | 178 | 180 | 192 | 169 |
| | Tensile elongation (%) | | | 6.2 | 5.4 | 3.5 | 5.6 |
| Fiber reinforced composite material | Content by volume of reinforcing fiber (%) | | | 56 | 55 | 55 | 56 |
| | 0° tensile strength (MPa) | | | 2870 | 2860 | 2500 | 2840 |
| | 0° compressive strength (MPa) | | | 1390 | 1420 | 1380 | 1410 |
| | CAI (MPa) | | | 234 | 241 | 200 | 236 |

[Resin Materials]

The following epoxy resins, polyamines, and accelerators were used in examples 15-18 and comparative examples 8-9. Measured compositions and properties of the epoxy resin compositions used in examples 15-18 and comparative examples 8-9 are summarized in Table 4.

Epoxy Resin
"Araldite" MY-0500 (N,N,O-triglycidyl-p-aminophenol, supplied by Vantico Ltd., epoxy equivalent weight 110)
"Epikote" 825 (diglycidyl ether of bisphenol A, liquid at room temperature, supplied by Japan Epoxy Resins Co., Ltd., epoxy equivalent weight 175)
GAN (N,N-diglycidyl aniline, supplied by Nippon Kayaku Ltd., epoxy equivalent weight 154)
"Epikote" 1750 (diglycidyl ether of bisphenol F, liquid at room temperature, supplied by Japan Epoxy Resins Co., Ltd., epoxy equivalent weight 160).
YSLV-80XY (diglycidyl ether of tetramethylbisphenol F, supplied by Nippon Steel Chemical Ltd., epoxy equivalent weight 195)

Aromatic Polyamine
"Epicure" W (diethyl toluenediamine, supplied by Japan Epoxy Resins Co., Ltd., active hydrogen equivalent weight 45).
3,3'-DAS (3,3'-diaminodiphenyl sulfone, supplied by Mitsui Kagaku Fine Chemicals Inc., active hydrogen equivalent weight 62)
"Sumicure" S (4,4'-diaminodiphenyl sulfone, supplied by Sumitomo Chemical Ltd., active hydrogen equivalent weight 62)

Accelerator
TBC (4-tert-butylcatechol, supplied by Ube Industries Ltd.)

Example 15

Here, 80 parts of "Araldite" MY-0500 and 20 parts of "Epikote" 825, selected as epoxy resin, were mixed and stirred for one hour at 70° C. To this, 44.1 parts of liquid (B2) used in example 11 was added to produce an epoxy resin composition, followed by measurement of its viscosity at 80° C., which was found to be 54 cP, showing that its viscosity was sufficiently low.

Then, cured resin plates were produced by the method described above and their properties were measured, with results indicating that their glass transition temperature after curing at 180° C. for two hours was 217° C. while their flexural modulus was 3.3 GPa, showing that they had sufficiently good mechanical properties. The theoretical molecular weight between crosslinking points of the cured product was 216 g/mol.

In addition, cured resin plates produced by the method described above were examined to determine their glass transition temperature after immersion in boiling water for 48 hours and their flexural modulus at 82° C., which were 136° C. and 2.3 GPa, respectively, showing that they had sufficiently high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2730 MPa, 1420 MPa, 1247 MPa, and 220 MPa, respectively, showing that it had sufficiently good mechanical properties.

Example 16

Here, 80 parts of "Araldite" MY-0500 and 20 parts of "Epikote" 1750, selected as epoxy resin, were mixed and stirred for one hour at 70° C. To this, 44.7 parts of liquid (B2) used in example 11 was added to produce an epoxy resin composition, followed by measurement of its viscosity at 80° C., which was found to be 48 cP, showing that its viscosity was sufficiently low.

Then, cured resin plates were produced by the method described above and their properties were measured, with results indicating that their glass transition temperature after curing at 180° C. for two hours was 212° C. while their flexural modulus was 3.4 GPa, showing that they had sufficiently good mechanical properties. The theoretical molecular weight between crosslinking points of the cured product was 215 g/mol.

In addition, cured resin plates produced by the method described above were examined to determine their glass transition temperature after immersion in boiling water for 48 hours and their flexural modulus at 82° C., which were 136° C. and 2.3 GPa, respectively, showing that they had sufficiently high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2730 MPa, 1470 MPa, 1260 MPa, and 221 MPa, respectively, showing that it had sufficiently good mechanical properties.

Example 17

Here, 60 parts of "Araldite" MY-0500 and 40 parts of "Epikote" 825, selected as epoxy resin, were mixed and stirred for one hour at 70° C. To this, 40.7 parts of liquid (B2) used in example 11 was added to produce an epoxy resin composition, followed by measurement of its viscosity at 80° C., which was found to be 48 cP, showing that its viscosity was sufficiently low.

Then, cured resin plates were produced by the method described above and their properties were measured, with results indicating that their glass transition temperature after curing at 180° C. for two hours was 214° C. while their flexural modulus was 3.0 GPa, showing that they had sufficiently good mechanical properties. The theoretical molecular weight between crosslinking points of the cured product was 246 g/mol.

In addition, cured resin plates produced by the method described above were examined to determine their glass transition temperature after immersion in boiling water for 48 hours and their flexural modulus at 82° C., which were 130° C. and 2.2 GPa, respectively, showing that they had sufficiently high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2730 MPa, 1410 MPa, 1140 MPa, and 234 MPa, respectively, showing that it had sufficiently good mechanical properties.

Example 18

Here, 70 parts of "Araldite" MY-0500, 10 parts of GAN, and 20 parts of "Epikote" 825, selected as epoxy resin, were mixed and stirred for one hour at 70° C. Seventy (70) parts of "Epicure", 15 parts of 3,3'-DAS, and 15 parts of "Sumicure", all selected as hardener, were mixed and stirred for one hour at 100° C. and after cooling down to 70° C., 2 parts of TBC was added, followed by further stirring for one hour to provide a hardener.

One hundred (100) parts of said epoxy resin and 40.2 parts of said hardener were mixed to produce an epoxy resin composition, followed by measurement of its viscosity at 80° C., which was found to be 46 cP, showing that its viscosity was sufficiently low.

Then, cured resin plates were produced by the method described above and their properties were measured, with results indicating that their glass transition temperature after curing at 180° C. for two hours was 208° C. while their flexural modulus was 3.3 GPa, showing that they had sufficiently good mechanical properties. The theoretical molecular weight between crosslinking points of the cured product was 225 g/mol.

In addition, cured resin plates produced by the method described above were examined to determine their glass transition temperature after immersion in boiling water for 48 hours and their flexural modulus at 82° C., which were 131° C. and 2.3 GPa, respectively, showing that they had sufficiently high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2830 MPa, 1420 MPa, 1190 MPa, and 227 MPa, respectively, showing that it had sufficiently good mechanical properties.

Comparative Example 8

One hundred (100) parts of "Epikote" 825 was used as epoxy resin. The same hardener as in example 18 was used here. One hundred (100) parts of said epoxy resin and 28 parts of said hardener were mixed to produce an epoxy resin composition, followed by measurement of its viscosity at 80° C., which was found to be 52 cP, showing that its viscosity was sufficiently low.

Then, cured resin plates were produced by the method described above and their properties were measured, with results indicating that their glass transition temperature after curing at 180° C. for two hours was 160° C. while their flexural modulus was 3.1 GPa, showing that they were poor in heat resistance. The theoretical molecular weight between crosslinking points of the cured product was 448 g/mol.

In addition, cured resin plates produced by the method described above were examined to determine their glass transition temperature after immersion in boiling water for 48 hours and their flexural modulus at 82° C., which were 108° C. and 1.8 GPa, respectively, showing that they were poor in both heat resistance and elastic modulus.

Further, this epoxy resin composition was used to produce fiber reinforced composite material, followed by measurement of its 0° tensile strength, 0° compressive strength, H/W 0° compressive strength, and CAI, which were found to be 2470 MPa, 1300 MPa, 980 MPa, and 236 MPa, respectively, showing that though it had high 0° compressive strength, it was poor in H/W 0° compressive strength.

Comparative Example 9

One hundred (100) parts of "Araldite" MY-721 was used as epoxy resin. The same hardener as in example 18 was used here.

One hundred (100) parts of said epoxy resin and 43.4 parts of said hardener were mixed to produce an epoxy resin composition, followed by measurement of its viscosity at 80° C., which was found to be 180 cP, showing that its viscosity was unfavorably high.

Then, cured resin plates were produced by the method described above and their properties were measured, with results indicating that their glass transition temperature after curing at 180° C. for two hours was 206° C. while their flexural modulus was 3.4 GPa, showing that they had high heat resistance and good mechanical properties. The theoretical molecular weight between crosslinking points of the cured product was 162 g/mol.

In addition, cured resin plates produced by the method described above were examined to determine their glass transition temperature after immersion in boiling water for 48 hours and their flexural modulus at 82° C., which were 148° C. and 2.6 GPa, respectively, showing that they were poor in both heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2430 MPa, 1480 MPa, 1260 MPa, and 193 MPa, respectively, showing that though it had high 0° compressive strength and high H/W 0° compressive strength, it was poor in tensile strength and CAI.

NC-3000 (polyglycidyl ether of phenol aralkyl resin, supplied by Nippon Kayaku Ltd., epoxy equivalent weight 275)

Polyamine

"Epicure" W (diethyl toluenediamine, supplied by Japan Epoxy Resins Co., Ltd., active hydrogen equivalent weight 45)

3,3'-DAS (3,3'-diaminodiphenyl sulfone, supplied by Mitsui Kagaku Fine Chemicals Inc., active hydrogen equivalent weight 62)

TABLE 4

|  |  |  |  | Example | | | | Comparative example | |
|---|---|---|---|---|---|---|---|---|---|
|  |  |  |  | 15 | 16 | 17 | 18 | 8 | 9 |
| Epoxy resin composition | Epoxy resin | "Araldite" MY-0500 | | 80 | 80 | 60 | 70 | | |
| | | "Epikote" 825 | | | 20 | | 40 | | 100 |
| | | "Epikote" 1750 | | | | 20 | | | |
| | | GAN | | | | | | 10 | |
| | | YSLV-80XY | | | | | | 20 | |
| | | "Araldite" MY-721 | | | | | | | 100 |
| | Hardener | Aromatic polyamine | "Epicure" W | 55.6 | 55.6 | 55.6 | 70 | 70 | 70 |
| | | | 3,3'-DAS | 22.2 | 22.2 | 22.2 | 15 | 15 | 15 |
| | | | "Sumicure" S | 22.2 | 22.2 | 22.2 | 15 | 15 | 15 |
| | | Accelerator | TBC | 1.0 | 1.0 | 1.0 | 1.0 | 1.0 | 1.0 |
| | Mixing ratio | Epoxy resin | | 100 | 100 | 100 | 100 | 100 | 100 |
| | | Hardener | | 44.1 | 44.7 | 40.7 | 40.2 | 28.0 | 43.4 |
| | Initial viscosity at 80° C. (mPa · s) | | | 54 | 48 | 48 | 46 | 125 | 1353 |
| Cured product | Flexural modulus (GPa) | Cured 180° C. × 2 hrs | | 3.3 | 3.4 | 3.0 | 3.3 | 3.1 | 3.4 |
| | | Immersed in boiling water 48 hrs | | 2.3 | 2.3 | 2.2 | 2.3 | 1.8 | 2.6 |
| | Glass transition temperature (° C.) | Cured 180° C. × 2 hrs | | 217 | 212 | 214 | 208 | 160 | 206 |
| | | Immersed in boiling water 48 hrs | | 136 | 136 | 130 | 131 | 108 | 148 |
| | Theoretical molecular weight between crosslinking points (g/mol) | | | 216 | 215 | 246 | 225 | 448 | 162 |
| Fiber reinforced composite material | Content by volume of reinforcing fiber (%) | | | 56 | 57 | 55 | 56 | 55 | 56 |
| | 0° tensile strength (MPa) | | | 2730 | 2730 | 2780 | 2830 | 2470 | 2430 |
| | 0° dry compressive strength (MPa) | | | 1420 | 1470 | 1410 | 1420 | 1300 | 1480 |
| | 0° H/W compressive strength (MPa) | | | 1250 | 1260 | 1140 | 1190 | 980 | 1260 |
| | CAI (MPa) | | | 220 | 221 | 234 | 227 | 236 | 193 |

[Resin Materials]

The following epoxy resins, polyamines, and accelerators were used in examples 19-23 and comparative examples 10-12. Measured compositions and properties of the epoxy resin compositions used in examples 19-23 and comparative examples 10-12 are summarized in Table 5.

Component (9): at least one epoxy resin selected from the group of N,N,N',N'-tetraglycidyl-4,4'-diaminodiphenylmethane and its alkyl-substituted derivatives "Araldite" MY-721 (N,N,N',N'-tetraglycidyl-4,4'-diamino-diphenylmethane, supplied by Vantico Ltd., epoxy equivalent weight 113)

Component (10): at Least One Epoxy Resin Selected from the Group of N,N-diglycidyl Aniline and its Alkyl-Substituted Derivatives GAN (diglycidyl aniline, supplied by Nippon Kayaku Ltd., epoxy equivalent weight 154)

Other Epoxy Resin

"Epikote" 630 (N,N,O-triglycidyl-p-aminophenol, supplied by Japan Epoxy Resins Co., Ltd., epoxy equivalent weight 97.5)

"Araldite" MY-0500 (N,N,O-triglycidyl-p-aminophenol, supplied by Vantico Ltd., epoxy equivalent weight 110)

"Sumicure" S (4,4'-diaminodiphenyl sulfone, supplied by Sumitomo Chemical Ltd., active hydrogen equivalent weight 62)

Accelerator:

TBC (4-tert-butylcatechol, supplied by Ube Industries Ltd.)

Example 19

Forty (40) parts of "Araldite" MY-721, selected as component (9), 10 parts of GAN, selected as component (10), 20 parts of "Epikote" 630, and 30 parts of Epikote 825, both selected as "other epoxy resin", were mixed and stirred for one hour at 70° C. to provide liquid (A3).

Then, 20 parts of 3,3'-DAS and 10 parts of "Sumicure" S were added to 70 parts of Epicure W and stirred for one hour at 100° C., and 0.7 part of TBC is added, followed by further stirring for one hour for homogeneous dissolution to provide liquid (B3).

One hundred (100) parts of liquid (A3) and 40.7 parts of liquid (B3) were mixed to produce an epoxy resin composition, followed by measurement of its viscosity at 80° C., which was found to be 50 cP, showing that its viscosity was sufficiently low.

Then, cured resin plates were produced by the method described above and their properties were measured, with results indicating that their glass transition temperature after curing at 180° C. for two hours was 205° C. while their flexural modulus was 3.3 GPa, showing that they had sufficiently good mechanical properties. The theoretical molecular weight between crosslinking points of the cured product was 215 g/mol.

In addition, cured resin plates produced by the method described above were examined to determine their glass transition temperature after immersion in boiling water for 48 hours and their flexural modulus at 82° C., which were 141° C. and 2.6 GPa, respectively, showing that they had sufficiently high heat resistance and high elastic modulus.

Further, this epoxy resin composition was used to produce fiber reinforced composite material, followed by measurement of its 0° tensile strength, 0° compressive strength, H/W 0° compressive strength, and CAI, which were found to be 2630 MPa, 1370 MPa, 1140 MPa, and 222 MPa, respectively, showing that it had sufficiently good mechanical properties.

Example 20

Forty (40) parts of "Araldite" MY-721, selected as component (9), 10 parts of GAN, selected as component (10), 20 parts of "Epikote" 630, 10 parts of "Epikote" 825, and 20 parts of NC-3000, all selected as "other epoxy resin", were mixed and stirred for one hour at 70° C. to provide liquid (A3). Liquid (B3) used in example 15 was also used as liquid (B3) here.

One hundred (100) parts of liquid (A3) and 38.7 parts of liquid (B3) were mixed to produce an epoxy resin composition, followed by measurement of its viscosity at 80° C., which was found to be 84 cP, showing that its viscosity was sufficiently low.

Then, cured resin plates were produced by the method described above and their properties were measured, with results indicating that their glass transition temperature after curing at 180° C. for two hours was 207° C. while their flexural modulus was 3.4 GPa, showing that they had sufficiently good mechanical properties. The theoretical molecular weight between crosslinking points of the cured product was 219 g/mol.

In addition, cured resin plates produced by the method described above were examined to determine their glass transition temperature after immersion in boiling water for 48 hours and their flexural modulus at 82° C., which were 148° C. and 2.6 GPa, respectively, showing that they had sufficiently high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2760 MPa, 1450 MPa, 1190 MPa, and 200 MPa, respectively, showing that it had sufficiently good mechanical properties.

Example 21

Forty (40) parts of "Araldite" MY-721, selected as component (9), 15 parts of GAN, selected as component (10), 10 parts of "Epikote" 630, and 35 parts of "Epikote" 825, both selected as "other epoxy resin", were mixed and stirred for one hour at 70° C. to provide liquid (A3). Liquid (B3) used in example 15 was also used as liquid (B3) here.

One hundred (100) parts of liquid (A3) and 39.1 parts of liquid (B3) were mixed to produce an epoxy resin composition, followed by measurement of its viscosity at 80° C., which was found to be 55 cP, showing that its viscosity was sufficiently low.

Then, cured resin plates were produced by the method described above and their properties were measured, with results indicating that their glass transition temperature after curing at 180° C. for two hours was 197° C. while their flexural modulus was 3.3 GPa, showing that they had sufficiently good mechanical properties. The theoretical molecular weight between crosslinking points of the cured product was 230 g/mol.

In addition, cured resin plates produced by the method described above were examined to determine their glass transition temperature after immersion in boiling water for 48 hours and their flexural modulus at 82° C., which were 138° C. and 2.6 GPa, respectively, showing that they had sufficiently high heat resistance and elastic modulus. Further, this epoxy resin composition was used to produce fiber reinforced composite material, followed by measurement of its 00 tensile strength, 0° compressive strength, H/W 0° compressive strength, and CAI, which were found to be 2700 MPa, 1410 MPa, 1200 MPa, 220 MPa, respectively, showing that it had sufficiently good mechanical properties.

Example 22

Forty (40) parts of "Araldite" MY-721, selected as component (9), 20 parts of GAN, selected as component (10), 40 parts of "Epikote" 825, selected as "other epoxy resin", were mixed and stirred for one hour at 70° C. to provide liquid (A3). Liquid (B3) used in example 15 was used as liquid (B3) here.

One hundred (100) parts of liquid (A3) and 37.4 parts of liquid (B1) were mixed to produce an epoxy resin composition, followed by measurement of its viscosity at 80° C., which was found to be 55 cP, showing that its viscosity was sufficiently low.

Then, cured resin plates were produced by the method described above and their properties were measured, with results indicating that their glass transition temperature after curing at 180° C. for two hours was 181° C. while their flexural modulus was 3.5 GPa, showing that they had sufficiently good mechanical properties. The theoretical molecular weight between crosslinking points of the cured product was 249 g/mol.

In addition, cured resin plates produced by the method described above were examined to determine their glass transition temperature after immersion in boiling water for 48 hours and their flexural modulus at 82° C., which were 133° C. and 2.7 GPa, respectively, showing that they had sufficiently high heat resistance and high elastic modulus.

Further, this epoxy resin composition was used to produce fiber reinforced composite material, followed by measurement of its 0° tensile strength, 0° compressive strength, H/W 0° compressive strength, and CAI, which were found to be 2920 MPa, 1480 MPa, 1190 MPa, and 234 MPa, respectively, showing that it had sufficiently good mechanical properties.

Example 23

Fifty (50) parts of "Araldite" MY-721, selected as component (9), 10 parts of GAN, selected as component (10), 30 parts of "Araldite" MY-0500, and 10 parts of "Epikote" 825, both selected as "other epoxy resin", were mixed and stirred for one hour at 70° C. to provide liquid (A3).

One hundred (100) parts of liquid (A3) and 42.8 parts of liquid (B3) were mixed to produce an epoxy resin composition, followed by measurement of its viscosity at 80° C., which was found to be 67 cP, showing that its viscosity was sufficiently low.

Then, cured resin plates were produced by the method described above and their properties were measured, with results indicating that their glass transition temperature after curing at 180° C. for two hours was 213° C. while their flexural modulus was 3.5 GPa, showing that they had sufficiently good mechanical properties. The theoretical molecular weight between crosslinking points of the cured product was 192 g/mol.

In addition, cured resin plates produced by the method described above were examined to determine their glass transition temperature after immersion in boiling water for 48 hours and their flexural modulus at 82° C., which were 143° C. and 2.7 GPa, respectively, showing that they had sufficiently high heat resistance and high elastic modulus.

Further, this epoxy resin composition was used to produce fiber reinforced composite material, followed by measurement of its 0°tensile strength, 0° compressive strength, H/W 0° compressive strength, and CAI, which were found to be 2780 MPa, 1470 MPa, 1070 MPa, and 193 MPa, respectively, showing that it had sufficiently good mechanical properties.

Comparative Example 10

One hundred (100) parts of "Araldite" MY-721, selected as component (9), was used as liquid (A3) here. One hundred (100) parts of "Epicure" W was used as liquid (B3) here.

One hundred (100) parts of liquid (A3) and 39.9 parts of liquid (B3) were mixed to produce an epoxy resin composition, followed by measurement of its viscosity at 80° C., which was found to be 1563 cP, showing that its viscosity was higher than seen in examples. Then, cured resin plates were produced by the method described above and their properties were measured, with results indicating that their glass transition temperature after curing at 180° C. for two hours was 221° C. while their flexural modulus was 3.6 GPa, showing that they had sufficiently good mechanical properties. The theoretical molecular weight between crosslinking points of the cured product was 158 g/mol.

In addition, cured resin plates produced by the method described above were examined to determine their glass transition temperature after immersion in boiling water for 48 hours and their flexural modulus at 82° C., which were 148° C. and 2.7 GPa, respectively, showing that they had sufficiently high heat resistance and high elastic modulus.

Further, this epoxy resin composition was used to produce fiber reinforced composite material, but the resulting fiber reinforced composite material was so high in the viscosity at 80° C. that it contained many unpregnated portions.

Comparative Example 11

Fifty (50) parts of "Araldite" MY-721, selected as component (9), 20 parts of GAN, selected as component (10), and 30 parts of "Epikote" 825, selected as "other epoxy resin", were mixed and stirred for one hour at 70° C. to provide liquid (A3). One hundred (100) parts of 3,3'-DAS was used as liquid (B3).

One hundred (100) parts of liquid (A3) and 48 parts of liquid (B3) were mixed to produce an epoxy resin composition, followed by measurement of its viscosity at 80° C., which was found to be 1000 cP, showing that its viscosity was higher than seen in examples. Then, cured resin plates were produced by the method described above and their properties were measured, with results indicating that their glass transition temperature after curing at 180° C. for two hours was 217° C. while their flexural modulus was 3.4 GPa, showing that they had sufficiently good mechanical properties. The theoretical molecular weight between crosslinking points of the cured product was 243 g/mol.

In addition, cured resin plates produced by the method described above were examined to determine their glass transition temperature after immersion in boiling water for 48 hours and their flexural modulus at 82° C., which were 145° C. and 2.6 GPa, respectively, showing that they had sufficiently high heat resistance and elastic modulus. Further, this epoxy resin composition was used to produce fiber reinforced composite material, but the resulting fiber reinforced composite material was so high in the viscosity at 80° C. that it contained many unpregnated portions.

Comparative Example 12

Twenty (20) parts of GAN, selected as component (10), and 80 parts of "Epikote" 825, selected as "other epoxy resin", were mixed and stirred for one hour at 70° C. to provide liquid (A3). One hundred (100) parts of "Epicure" W was used as liquid (B3) here. One hundred (100) parts of liquid (A3) and 27.8 parts of liquid (B3) were mixed to produce an epoxy resin composition, followed by measurement of its viscosity at 80° C., which was found to be 265 cP, showing that its viscosity was somewhat high.

Then, cured resin plates were produced by the method described above and their properties were measured, with results indicating that their glass transition temperature after curing at 180° C. for two hours was 156° C. while their flexural modulus was 3.2 GPa, showing that they were poor in heat resistance. The theoretical molecular weight between crosslinking points of the cured product was 414 g/mol.

In addition, cured resin plates produced by the method described above were examined to determine their glass transition temperature after immersion in boiling water for 48 hours and their flexural modulus at 82° C., which were 109° C. and 2.0 GPa, respectively, showing that they were poor in both high heat resistance and elastic modulus. Further, this epoxy resin composition was used to produce fiber reinforced composite material, followed by measurement of its 0° tensile strength, 0° compressive strength, H/W 0° compressive strength, and CAI, which were found to be 2890 MPa, 1300 MPa, 940 MPa, and 240 MPa, respectively, showing that though it was high in 0° tensile strength, 0° compressive strength, and CAI, but it was poor in H/W 0° compressive strength.

TABLE 5

| | | | | Example | | | | | Comparative example | | |
|---|---|---|---|---|---|---|---|---|---|---|---|
| | | | | 19 | 20 | 21 | 22 | 23 | 10 | 11 | 12 |
| Epoxy resin composition | Epoxy resin | Component (9) | "Araldite" MY-721 | 40 | 40 | 40 | 40 | 50 | 100 | 50 | |
| | | Component (10) | GAN | 10 | 10 | 15 | 20 | 10 | | 20 | 20 |
| | | Others | "Epikote" 630 | 20 | 20 | 10 | | | | | |
| | | | "Epikote" 825 | 30 | 10 | 35 | 40 | 10 | | 30 | 80 |
| | | | NC-3000 | | 20 | | | 30 | | | |
| | | | "Epikote" MY-0500 | | | | | 30 | | | |
| | Hardener | Aromatic polyamine | "Epicure" W | 70 | 70 | 70 | 70 | 70 | 100 | | 100 |
| | | | 3,3'-DAS | 20 | 20 | 20 | 20 | 25 | | 100 | |
| | | | "Sumicure" S | 10 | 10 | 10 | 10 | 5 | | | |
| | | Accelerator | TBC | 1 | 1 | 1 | 1 | 1 | 1 | 1 | 1 |
| | Mixing ratio | Epoxy resin | | 100 | 100 | 100 | 100 | 100 | 100 | 100 | 100 |
| | | Hardener | | 40.7 | 38.7 | 39.1 | 37.4 | 42.8 | 39.8 | 48.0 | 27.8 |
| | Initial viscosity at 80° C. (mPa·s) | | | 50 | 84 | 55 | 55 | 67 | 1563 | 1000 | 265 |
| Cured product | Flexural modulus (GPa) | | Cured 180° C. × 2 hrs | 3.3 | 3.4 | 3.3 | 3.5 | 3.5 | 3.6 | 3.4 | 3.2 |
| | | | Immersed in boiling water 48 hrs | 2.6 | 2.6 | 2.6 | 2.7 | 2.7 | 2.7 | 2.6 | 2.0 |
| | Glass transition temperature (° C.) | | Cured 180° C. × 2 hrs | 205 | 207 | 197 | 181 | 213 | 221 | 217 | 156 |
| | | | Immersed in boiling water for 48 hrs | 141 | 148 | 138 | 133 | 134 | 148 | 145 | 109 |
| Fiber reinforced composite material | Content by volume of reinforcing fiber (%) | | | 56 | 58 | 55 | 56 | 57 | — | — | 56 |
| | 0° tensile strength (MPa) | | | 2630 | 2760 | 2700 | 2920 | 2780 | | | 2890 |
| | 0° dry compressive strength (MPa) | | | 1370 | 1450 | 1410 | 1480 | 1470 | | | 1300 |
| | 0° H/W compressive strength (MPa) | | | 1140 | 1190 | 1200 | 1190 | 1290 | | | 940 |
| | CAI (MPa) | | | 222 | 200 | 220 | 234 | 206 | | | 240 |

The invention claimed is:

1. An epoxy resin composition for fiber reinforced composite material comprising the following components (1)-(4), and meeting the following conditions (I)-(IV) for mixing ratios:

Component (1): an epoxy resin, comprising N,N-diglycidyl aniline or N,N-diglycidyl-o-toluidine, that is liquid at room temperature, Component (2): an aromatic polyamine that is liquid at room temperature, Component (3): diaminodiphenylsulfone, comprising 3,3'-diaminodiphenylsulfone and 4,4'-diaminodiphenylsulfone, and Component (4): 4-tert-butylcatechol as a curing accelerator, Condition (I): the proportion of component (1) relative to the entire epoxy resin in the composition is 60-100 wt %, Condition (II): the total proportion of component (2) and component (3) combined relative to the entire polyamine in the composition is 70-100 wt %, Condition (III): the proportion of component (3) relative to the entire polyamine in the composition is 25-60 wt %, and Condition (IV): the stoichiometric ratio of the entire polyamine to the entire epoxy resin in the composition is 0.7-1.3:1, wherein amounts of Components (1)-(4) are determined so that a theoretical molecular weight between crosslinking points, α, of the cured resin is 250-350 g/mol.

2. An epoxy resin composition for fiber reinforced composite material according to claim 1 wherein precipitation of component (3) does not take place in liquid (B1) during storage for 30 days at 5° C.

3. An epoxy resin composition for fiber reinforced composite material according to claim 1 wherein the weight ratio of component (3) to component (2) is 0.25:1 or more.

4. An epoxy resin composition for fiber reinforced composite material according to claim 1 wherein component (2) comprises diethyl toluenediamine.

5. An epoxy resin composition for fiber reinforced composite material according to claim 1, wherein the cured product of the epoxy resin composition obtained by being cured for two hours at 180° C., has a glass transition temperature of 170° C. or more and a coefficient of linear expansion of $7 \times 10^{-5} K^{-1}$ or less over the temperature range from 30° C. to 160° C.

6. An epoxy resin composition for fiber reinforced composite material according to claim 1 wherein the initial viscosity at 80° C. is in the range of 1-500 MPa·s.

7. An epoxy resin composition for fiber reinforced composite material according to claim 1 wherein the viscosity after storage for one hour at 80° C. is four times the initial viscosity or less.

8. An epoxy resin composition for fiber reinforced composite material according to claim 1 wherein the viscosity after storage for one hour at 80° C. is in the range of 1-1000 MPa·s.

9. An epoxy resin composition for fiber reinforced composite material according to claim 1, wherein the cured product of the epoxy resin composition obtained by being cured for two hours at 130° C., has a glass transition temperature of 120° C. or more.

* * * * *